United States Patent [19]

Metzner et al.

[11] Patent Number: 4,547,678
[45] Date of Patent: Oct. 15, 1985

[54] HYBRID ELECTRIC VEHICLE CONTROL METHODS AND DEVICES

[75] Inventors: Robert G. Metzner, Beverly Hills; Stephen H. Smith, Playa del Rey, both of Calif.

[73] Assignee: Califone International, Inc., Los Angeles, Calif.

[21] Appl. No.: 579,795

[22] Filed: Feb. 15, 1984

Related U.S. Application Data

[62] Division of Ser. No. 111,260, Jan. 11, 1980, abandoned.

[51] Int. Cl.⁴ .............................................. B60L 11/14
[52] U.S. Cl. ..................................... 290/40 C; 290/45
[58] Field of Search ............... 290/3, 4 R, 4 C, 40 R, 290/40 C, 45

[56] References Cited

U.S. PATENT DOCUMENTS

| | | | |
|---|---|---|---|
| 1,824,014 | 9/1931 | Froelich | 180/65 A X |
| 2,179,546 | 11/1939 | Ernst et al. | 180/65 C X |
| 2,244,216 | 6/1941 | Pieper | 180/65 A X |
| 2,666,492 | 1/1954 | Nims et al. | 180/65 A |
| 3,184,670 | 5/1965 | Reynolds | 318/300 |
| 3,211,249 | 10/1965 | Papst | 180/65 A |
| 3,454,122 | 7/1969 | Grady, Jr. | 180/65 R |
| 3,499,164 | 3/1970 | Ferre et al. | 290/45 X |
| 3,502,165 | 3/1970 | Matsukata | 180/65 A X |
| 3,503,464 | 3/1970 | Yardney | 180/65 A |
| 3,533,484 | 10/1970 | Wood, Jr. | 180/65 R |
| 3,551,685 | 12/1970 | Corry | 290/40 R X |
| 3,623,568 | 11/1971 | Mori | 180/65 A |
| 3,732,751 | 5/1973 | Berman et al. | 290/4 C X |
| 3,837,419 | 9/1974 | Nakamura | 180/65 C |
| 3,884,318 | 5/1975 | Abels et al. | 180/65 R |
| 3,888,325 | 6/1975 | Reinbeck | 290/45 X |
| 3,955,097 | 5/1976 | Hobo et al. | 290/40 R |
| 3,970,163 | 7/1976 | Kinoshita | 180/65 A |
| 4,037,144 | 7/1977 | Ohmae et al. | 318/338 |
| 4,042,056 | 8/1977 | Horwinski | 180/65 A |
| 4,090,577 | 5/1978 | Moore | 180/65 R |
| 4,099,111 | 7/1978 | Inaba et al. | 318/332 X |
| 4,247,807 | 1/1981 | Wilson | 318/405 X |

FOREIGN PATENT DOCUMENTS 2434167 2/1976 Fed. Rep. of Germany .... 180/65 R

OTHER PUBLICATIONS

Robert J. Traister, All About Electric and Hybrid Car, Tab Books, Inc., Blue Ridge Summit, Pa., pp. 55-57.

Primary Examiner—William M. Shoop, Jr.
Assistant Examiner—W. E. Duncanson, Jr.
Attorney, Agent, or Firm—Lyon & Lyon

[57] ABSTRACT

Disclosed herein are vehicle control devices and methods including a signal processor responsive to a signal proportional to dynamo speed and a second signal proportional to desired torque. The signal processor provides a control signal for suitable armature voltage control means which controls the armature voltage so as to adjust dynamo torque with respect to the desired torque signal. The signal processor further in response to the dynamo speed signal and in response to a signal proportional to brake pedal position provides a control signal to chopper means for adjusting the power generated by the dynamos in response to the brake pedal position. The signal processor further controls the dynamo field with respect to dynamo torque and speed so as to maximize dynamo operating efficiency. Various related devices and methods are also disclosed.

6 Claims, 23 Drawing Figures

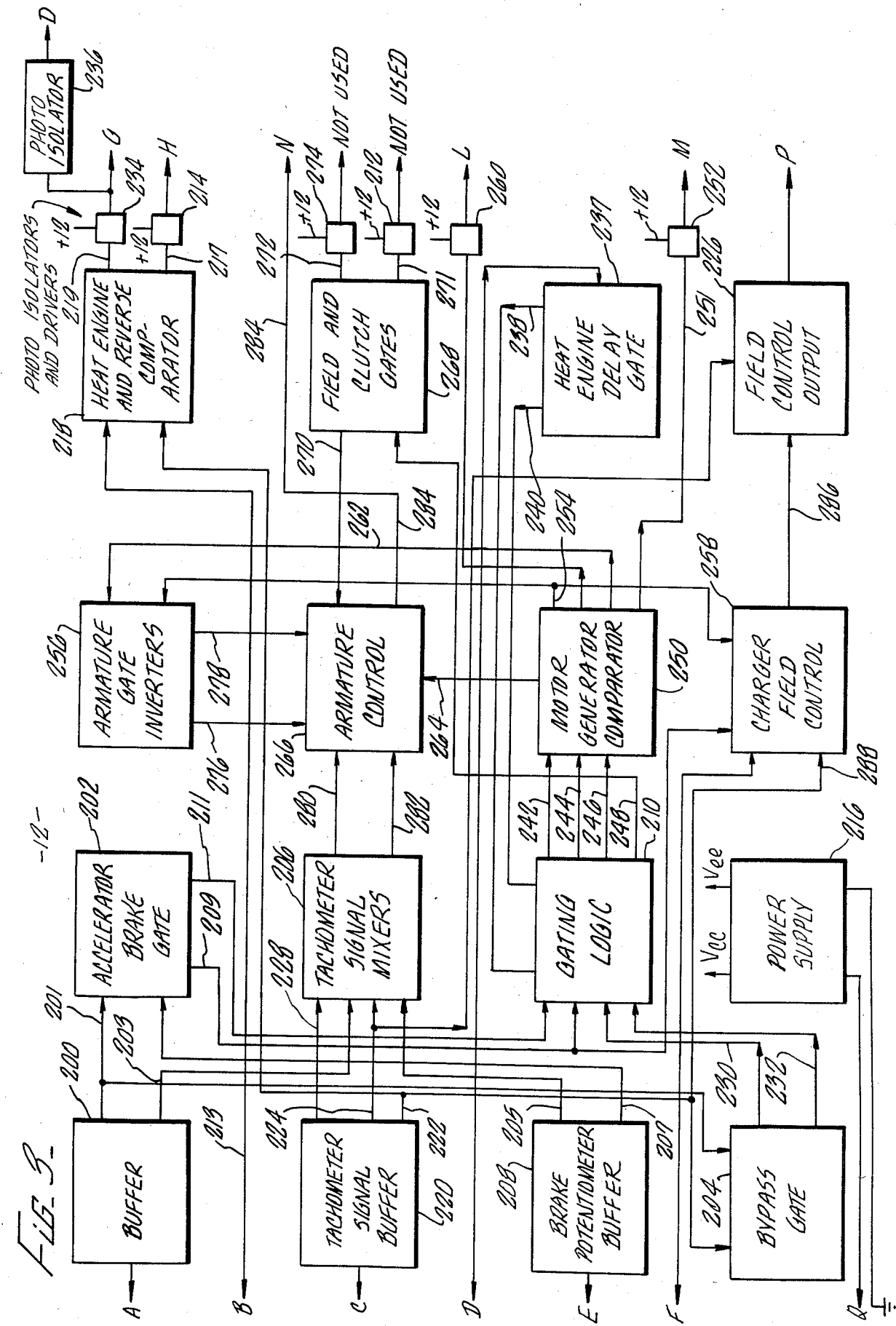

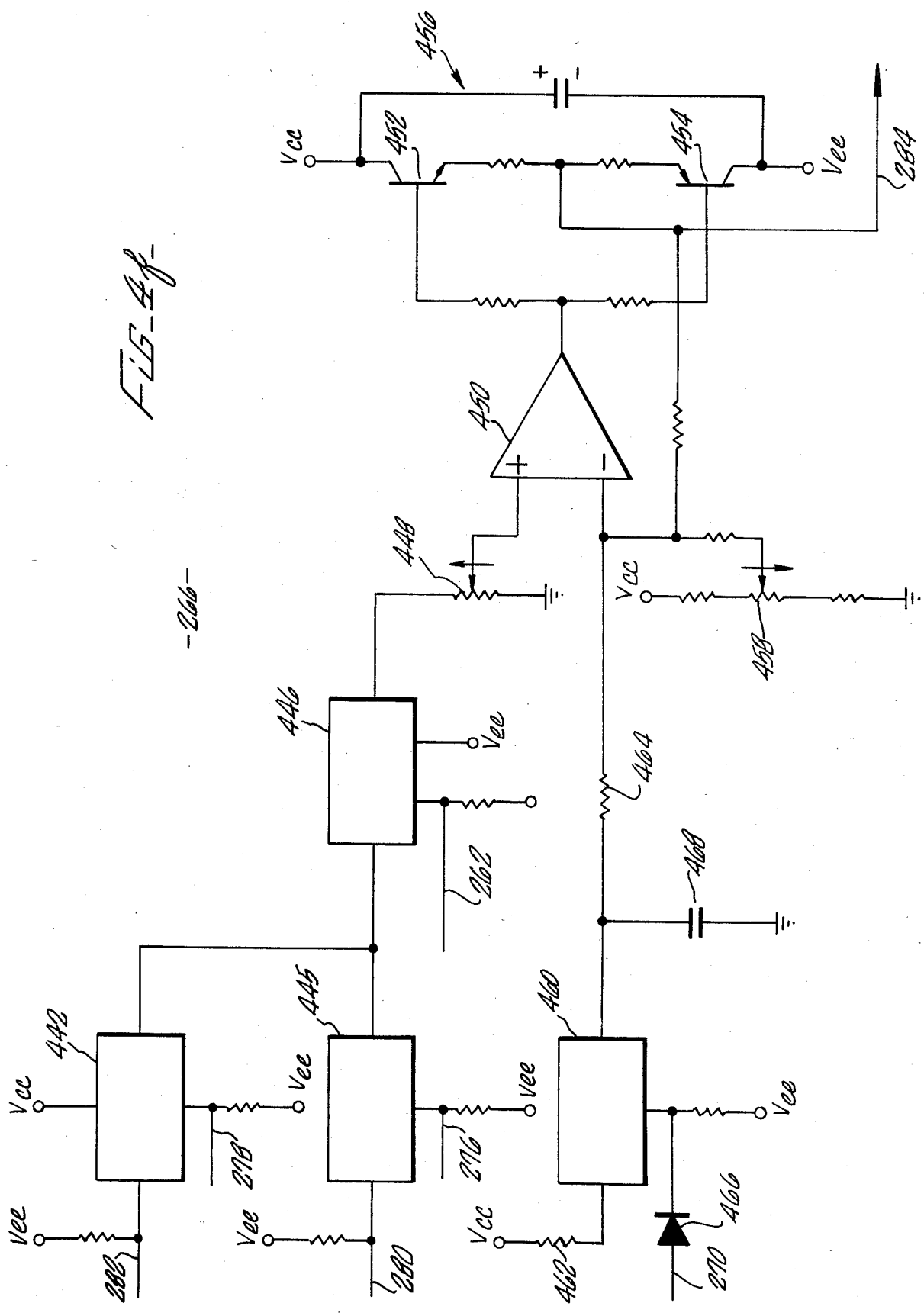

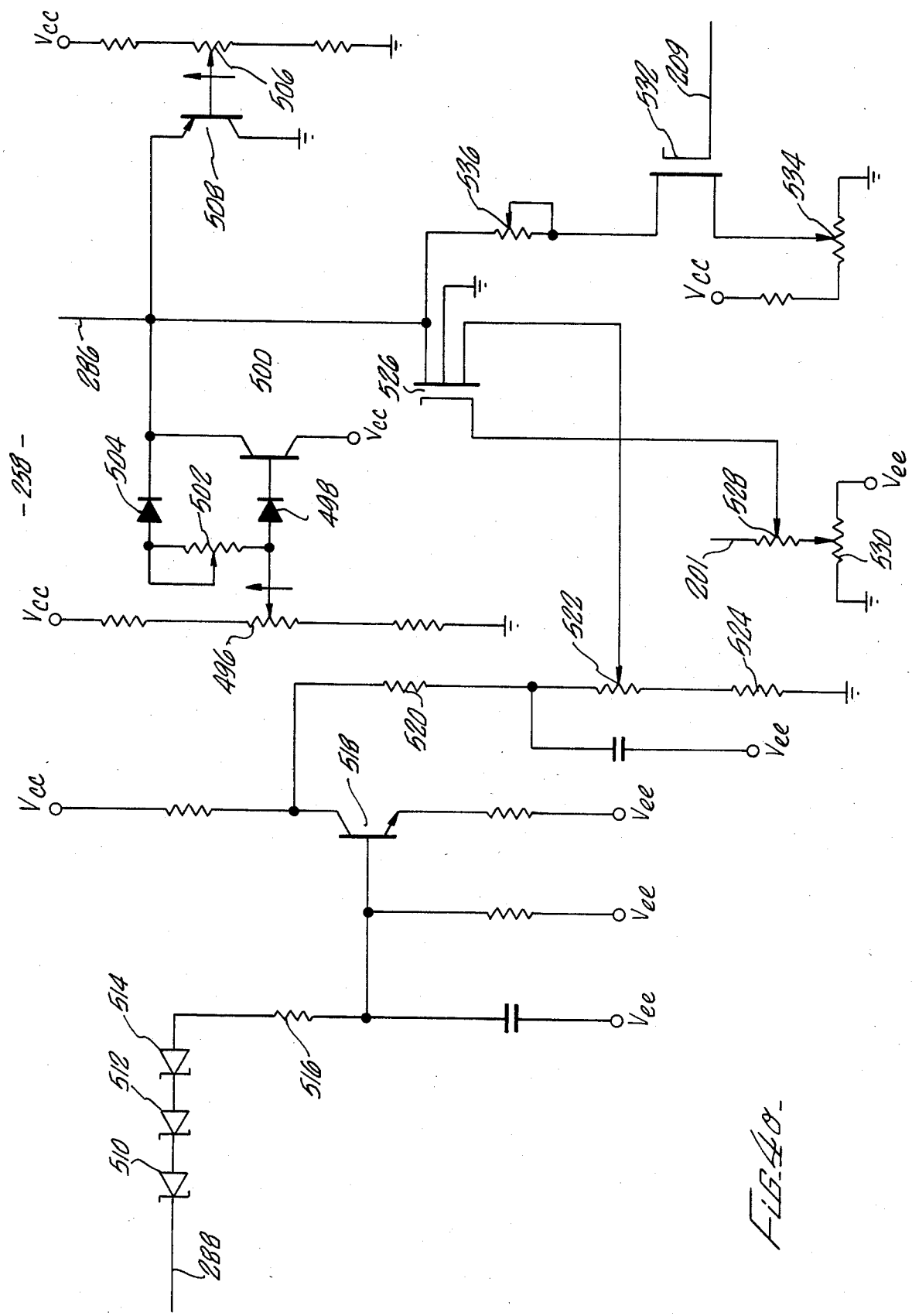

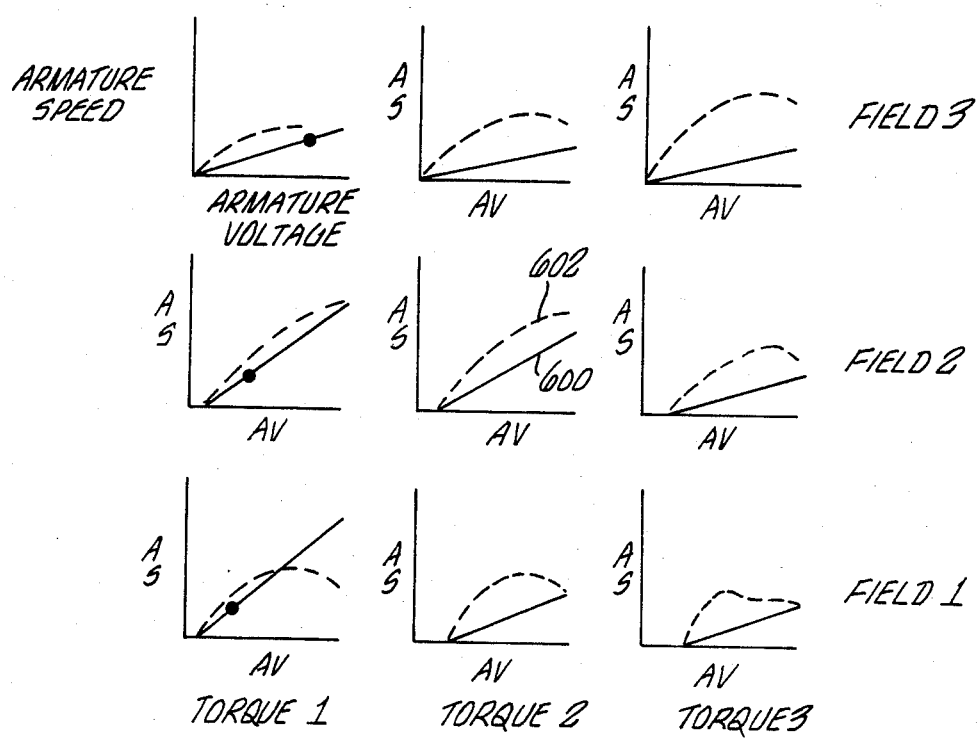
FIG_5_

HYBRID ELECTRIC VEHICLE CONTROL METHODS AND DEVICES

This application is a division, of application Ser. No. 111,260, filed 1/11/80, now abandoned.

RELATED APPLICATIONS

This application is related to the applications of Stephen H. Smith entitled "High Speed Non-Saturating Inverter" and "Improved Coulometer", both filed concurrently herewith.

BACKGROUND OF THE INVENTION

The present invention relates generally to hybrid vehicles and more particularly to improved control devices and methods for the operation of a vehicle including at least one electric dynamo.

As the cost of energy continues to increase, various hybrid vehicle designs have been proposed which are intended to more efficiently utilize the energy available so as to decrease the cost of operating such a vehicle. Hybrid vehicles by definition include at least two motor means which may be combined in such a fashion so as to approach the desired result of increased overall efficiency. One such hybrid combination which is well known includes a heat engine such as an internal combustion gasoline or diesel engine in combination with one or more electric dynamos which may be used as generators to convert power from the heat engine into electrical energy that is then stored and which may then be used as electric motors to convert the stored electrical energy into driving torque for the vehicle.

In such vehicles it has been known to control the speed of the dynamo when operating as a motor by varying the voltage applied to the dynamo. This applied voltage has been previously varied for example by means of a variable resistor in series with the motor and has more recently been controlled by means of a "chopper" which varies the pulse width of the voltage applied to the dynamo in proportion to the speed desired. Such means of speed control however result in several undesirable dynamo performance characteristics.

For example, when a speed change is required and the voltage or chopper pulse width is varied accordingly, the dynamo current and torque may increase to the performance limit of the dynamo until the desired speed is obtained. Generally, this performance limit is established by the armature circuit resistance and the difference between the dynamo terminal voltage and the induced electromotive force within the armature. As is to be appreciated, this sudden increase in machine current may cause safety fuses or circuit breakers to open thereby disabling the vehicle. Additionally, and in a fashion similar to automobiles, the sudden changes in torque that would be associated with corresponding movements of an accelerator pedal adapted to control the speed of the dynamo results in poor driveability and increases the difficulty in the transition from an automobile powered by conventional means such as an internal combustion gasoline engine to a electrically powered vehicle.

In a hybrid vehicle, the dynamo may be used to generate electricity during the operation of the heat engine so that the electricity may be stored for future use. Also the dynamo may be used as a generator to assist in braking the vehicle. Preferably, regenerative braking is employed such that the power generated while braking is stored rather than simply dissipated as is done with dynamic braking.

Generation of electricity during the operation of the heat engine is often done at a constant charging rate as is disclosed in pending application Ser. No. 98,930 filed Nov. 30, 1979 in the names of Fields and Metzner. A continuous rate of power generation however may result in operating the heat engine at inefficient power levels since most heat engines operate most efficiently through a relatively narrow power range.

Furthermore, during regenerative braking where the dynamo is used as a generator to slow the vehicle by generating electric power which may be then stored by means of for example storage batteries, it is known to control the dynamo power output by means of a chopper whose pulse width varies directly with the condition of the brake pedal as is also disclosed in the aforementioned pending application. However, and in a manner analogous to that described above with respect to the speed control of the dynamo when operated as a motor, this method of controlling the dynamo as a generator quickly causes the dynamo to increase to its rated power output for a relatively small change in brake pedal position, thus making the control of the vehicle during regenerative braking difficult and again impairing the overall driveability of the vehicle and still further increasing the difficulty a driver might have in transitioning from a conventional vehicle which may be equipped with hydraulic brakes to a hybrid vehicle equipped at least in part with a regenerative braking system.

As is to be further appreciated, it is desirable for the regenerative braking system to operate to relatively slow speeds. Although the braking system described in the previously identified pending application may operate to as low as for example ten miles per hour, the remaining deceleration of the vehicle must be accomplished with other braking means such as a secondary or auxiliary hydraulic system, thus even further increasing the difficulty in smoothly braking the vehicle since the vehicle operator must compensate for the loss of regenerative braking by adjusting the brake pedals so as to apply the auxiliary or secondary hydraulic brakes. Additionally, the energy that might be otherwise recovered by regenerative braking below ten miles per hour is lost to the hydraulic braking system as, for example, wasted heat, thus decreasing the overall efficiency of the hybrid vehicle.

As is also disclosed in the aforementioned pending application, the means for converting the dynamo from motor operation to generator operation or vice versa includes four contactors which reverse the dynamo armature. Because the contactors increase the switching complexity, the vehicle weight and the overall vehicle power consumption, it is desirable to perform the conversion with as few circuit contactors as possible.

As was mentioned previously, it is desired to maximize the overall efficiency of the hybrid vehicle as a system so as to maximize the vehicle performance in proportion to the total energy consumed. Generally, however, dynamos when operated as motors achieve a maximum efficiency only over a relatively narrow range of motor speed versus torque developed. As is apparent, the dynamos used with hybrid vehicles must operate instead over a relatively broad range of speed and torque combinations. Thus the dynamos are usually operated in a inefficienct manner which tends to decrease the overall operating efficiency of the hybrid vehicle system.

If the overall object of the hybrid vehicle is to increase the efficiency of the vehicle, it is generally known to employ in such vehicles a relatively small heat engine having a proportionally low power output. Although this power output may be sufficient in most driving circumstances, it is also known that as a matter of practical experience occasions may arise where the power of the heat engine is not sufficient to meet the requirements of the particular driving situation. Hybrid vehicles in general and more specifically the hybrid vehicle of the aforementioned pending application do not deal with this problem thus decreasing the desirability of such vehicles and at least to an extent limiting the public acceptance thereof.

SUMMARY OF THE INVENTION

The hybrid vehicle control system of the present invention overcomes the limitations and deficiencies described above. A hybrid vehicle which may be adapted to include the control system according to the present invention may include a heat engine in combination with dynamos which together cooperate to propel the vehicle throughout its performance range. In a preferred embodiment, the hybrid vehicle includes two dynamos which each have separately controlled armature and field windings by a respective high-frequency chopper. A signal processor is responsive to signals proportional to accelerator position, brake pedal position and to a signal from a tachometer proportional to the rotational speed of the dynamos.

The signal processor, in response to the signals, generates control signals which are applied to the respective armature and field choppers so as to regulate the pulse width or duty cycle thereof. The signal processor during dynamo motor operation sums the tachometer signal with the accelerator signal such that the chopper adjusts the dynamo armature voltage with respect to the armature back electomotive force (emf) so as to allow current to flow through the armature in proportion to the armature rated load current according to the position of the accelerator within its range of travel. Thus the signal processor operates as a dynamo torque controller rather than a speed controller and in this way more nearly simulates the response of an accelerator pedal in a conventional vehicle.

In a similar fashion, the signal processor subtracts the brake signal from the tachometer signal during regenerative braking such that the armature current in proportion to the full load armature current is proportional to the position of the brake pedal within its dynamic braking range of travel, thus operating as a regenerative braking torque controller.

When the dynamos are operated as generators, in addition to the regenerative braking technique just described, the signal processor further controls the field choppers and thus the magnetic field strength to substantially level the power load on the heat engine so that the heat engine is operated generally near its most efficient power point. When the accelerator position indicates that little power is required from the heat engine to propel the vehicle, the field intensity is proportionally increased. As the accelerator position indicates that more torque from the heat engine is required to propel the vehicle, the field strength is proportionally decreased to some minimum level, to thereby maintain a subtantially constant load upon the heat engine near its most efficient power point.

The choppers used in the hybrid vehicle control system of the present invention are preferably ultrasonic or high-frequency choppers as described in copending application Ser. No. 111,259 filed concurrently in the name of Smith and entitled High Speed Non-Saturating Inverter and assigned to the same assignee as the present application. As a result, no additional inductance need be included in the armature circuit to step up the armature voltage during power generation and furthermore regenerative braking may be accomplished throughout the vehicle speed range including speeds approaching zero miles per hour.

The hybrid vehicle control system additionally includes field reversing means for reversing the field current when it is desired to convert from motor operation to generator operation or vice versa. This novel field reversal enables the armature circuit to be controlled with only two contactors.

The signal processor additionally in response to the accelerator signal and the tachometer signal operates the field winding choppers such that the magnetic flux within the field magnetic circuit is optimized for most efficient dynamo operation for combinations of speed and torque throughout the operating performance range of the vehicle. Thus the overall operating efficiency of the vehicle is increased. The signal processor in performing this field control relates the dynamo tachometer signal to dynamo speed and relates the accelerator signal to dynamo torque and in turn generates the required field chopper control signal.

The signal processor additionally senses the accelerator signal so as to detect when the pedal has been depressed to a position greater than ninety percent of its travel range thus indicating that the vehicle operator is requiring maximum performance from the vehicle. If the heat engine is propelling the vehicle, the signal processor converts the dynamos from generators to motors and controls the motors so as to provide additional torque to the vehicle wheels to thereby provide a high-performance operating range which may be useful for example in entering expressway traffic or in passing other vehicles.

It is thus an object of the present invention to provide an improved hybrid vehicle control system.

It is a further object of the present invention to provide a control system which operates substantially as dynamo torque controller.

It is a further object of the present invention to provide a hybrid vehicle control system for the more efficient operation of a hybrid vehicle.

It is a further object of the present invention to provide a hybrid vehicle controller having improved driveability characteristics.

These and other objects and advantages of the present invention will be understood with reference to the drawings and the detailed description associated therewith.

BRIEF DESCRIPTION OF THE DRAWINGS

FIG. 3 is a block diagram of a signal processor according to a preferred embodiment of the present invention.

FIG. 5 is a plurality of graphs demonstrating dynamo armature speed versus armature voltage for ranges of torque and field.

DETAILED DESCRIPTION OF THE DRAWINGS

Figure 1:
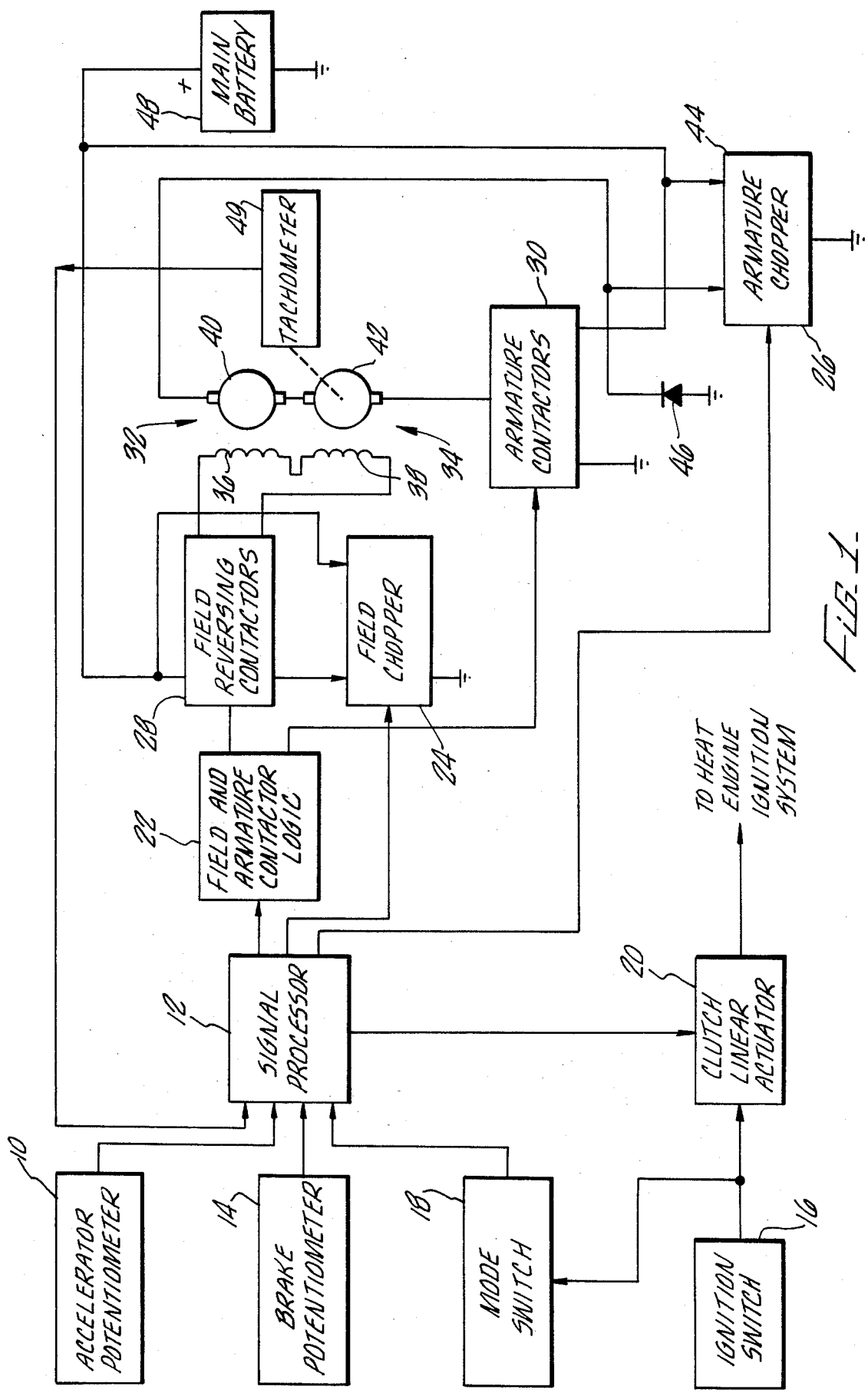
FIG. 1 is a block diagram of a vehicle control system according to the present invention.

With reference now to FIG. 1 and the vehicle control system illustrated therein, an accelerator potentiometer 10 or other suitable accelerator pedal position transducer means provides a signal proportional to the accelerator pedal position to a signal processor 12. A brake potentiometer 14 in a manner similar to the accelerator potentiometer provides a second signal to the signal processor 12 that is proportional to the position of the brake pedal throughout its range of travel. An ignition switch 16 provides an ignition signal to a mode switch 18 and to a clutch linear actuator 20. The ignition switch 16 may for example be a key operated switch as is generally employed in conventional automobiles. The mode switch 18 in response to the ignition signal provides a plurality of mode signals to the signal processor 12 according to the mode switch 18 position as adjusted by the operator. For example, the signals may indicate that the mode switch 18 has been set to an OFF, FORWARD, or REVERSE position.

The clutch linear actuator 20 is responsive to a control signal from the signal processor 12 which causes the clutch linear actuator 20 to operate a conventional clutch so as to engage or disengage the heat engine from the vehicle heat engine drive train. A suitable clutch linear actuator may be similar to that disclosed in the previously referenced pending application in the names of Fields and Metzner, although other actuator means may be used. In response to the movement of the clutch linear actuator 20, a switch within the actuator 20 applies the ignition signal from the switch 16 to the heat engine when the clutch linear actuator 20 has engaged the clutch and conversely removes the ignition signal when the clutch is disengaged. Thus the signal processor 12 not only controls the position of the clutch by means of the clutch linear actuator 20 but also controls the application of the ignition voltage to the heat engine thereby energizing the heat engine in response to the signal processor 12 signal.

It will be recognized by those skilled in the art that the control system generally depicted in FIG. 1 may be adapted to various electrically powered vehicles including hybrid vehicles. Generally a suitable hybrid vehicle which may employ such a control system is described in the aforementioned pending application.

The signal processor 12 responds to the applied signals and provides control signals to field and armature contactor logic 22, a field chopper 24 and an armature chopper 26. The field and armature contactor logic 22 in turn applies control signals to field reversing contactors 28 and armature contactors 30. The field reversing contactors 28 are connected to a main battery 48 positive terminal.

Two dynamos 32 and 34 each respectively include a field coil 36, 38 and an armature 40, and 42. The field coils 36 and 38 are connected in series and the series combination is in turn applied to the field reversing contactors 28. The contactors 28 as controlled by the signal from the field and armature contactor logic 22 controls the direction of current flow through the series connected fields 36 and 38 according to the desired direction of the travel and the operating mode of the dynamos 32 and 34, that is, whether the dynamos are to operate as motors or generators.

The pulse width of the field choppper 24 is varied in response to the control signal from the signal processor 12 and thus controls the magnitude of the current flowing through the field coils 36 and 38 in a well known fashion. Preferably the field chopper 24 operates at an ultrasonic frequency which may be for example 25 KHz, although other lower frequencies are suitable as will be recognized by those skilled in the art. Furthermore, the field coils 36 and 38 are preferably selected and wound such that the field iron or steel within the field magnetic circuit may be fully saturated when the field chopper 24 is adjusted to apply the maximum available voltage across the series connected field windings 36 and 38.

With continued reference to FIG. 1 and in particular to the dynamos 32 and 34, the armatures 40 and 42 thereof are connected in series and this series combination is connected from the armature contactors 30 to an armature chopper 44. The cathode of a protective diode 46 is connected to the junction of the armature 40 with the armature chopper 44 and the anode thereof is connected to ground or return.

Although the fields 36 and 38 and the armatures 40 and 42 have been described as series-connected, it will be realized that the control system of FIG. 1 is readily adaptable to, for example, parallel-connected dynamos according to the requirements of the particular dynamos and the voltage available.

The armature contactors 30 in response to the control signal from the field and armature contactor logic 22 connects the applied terminal of the armature 42 either to ground or to a positive terminal of the main battery 48. The battery 48 may be a series connected combination of storage batteries which provide a nominal terminal voltage of 48 volts DC. The negative or return terminal of the main battery 48 is connected to ground.

The armature chopper 44 as previously described is connected to the armature 40 and is also connected to the positive terminal of the main battery 48. As with the field chopper 24, the armature chopper 44 is preferably a high-frequency chopper operating at approximately 25 KHz although lower frequencies are also suitable. In a manner similar to that of the field chopper 24, the armature chopper 24 alternately connects and disconnects the armature 40 to ground at a frequency determined by the operating frequency of the chopper and at a pulse width or duty cycle controlled by means of the chopper control signal from the signal processor 12.

A tachometer 49 is mechanically connected through suitable means to the shaft of the armature 42 and provides a signal which is proportional to the shaft speed to the signal processor 12. Is assumed of course that the armatures are mechanically coupled to for example the wheels of the vehicle through suitable power transmission means.

The operation of the vehicle control system may thus now be summarized with reference to FIG. 1.

It is initially assumed that the ignition switch 16 and the mode switch 18 are set to off positions and that the accelerator and brake pedals which control the accelerator and brake potentiometers 10 and 14 are released. The ignition switch 16 is then moved to an on position and it is further assumed that the mode switch 18 is adjusted to the FORWARD position.

The signal processor 12 applies signals to the field and armature contactor logic 22 indicating that the vehicle is to be operated in the forward direction and that the dynamos 32 and 34 are to be operated as motors to provide electric vehicle operation. The field and armature contactor logic 22 in turn controls the field reversing contactors 28 so as to apply the correct field polarity to the dynamos 32 and 34 for motor operation. In a preferred embodiment according to FIG. 1, the field reversing contactors 28 are controlled to apply current from the main battery 48 field voltage source in series first through the field 38 and then through the field 36 to the field chopper 24. The armature contactors 30 are also controlled by the field and armature contactors logic 22 so as to connect the main battery 48 positive terminal through the contactors 30, the armature 42 and in turn to the armature 40 and the armature chopper 44. With the fields 36 and 38 and the armatures 42 and 40 connected in this way, the dynamos 32 and 34 are operated as motors in response to the field and armature choppers 24 and 44 as is to be described.

Now assuming that the accelerator is depressed to, for example, approximately ten percent of its travel, the accelerator potentiometer 10 provides a signal proportional to that position to the signal processor 12. The signal processor 12 in response to the signal from the tachometer 49 representing dynamo armature speed and also in response to the accelerator position signal, provides a control signal to the field chopper 24 which adjusts the field current to provide the substantially optimum field flux density as a function of the dynamo speed represented by the tachometer signal and the dynamo torque represented by the accelerator position.

The signal processor 12 also controls the armature chopper 44 so as to substantially control the current through the dynamos 40 and 42 and thus the torque produced by the dynamos 40 and 42 so as to be proportional to the position of the accelerator pedal with respect to the overall accelerator pedal travel range. Assuming still that the accelerator has been moved through ten percent of its travel, the signal processor 12 thus adjusts the armature chopper 44 so as to apply substantially ten percent of the rated dynamo current through the dynamos 40 and 42 and to thus proportionally produce substantially ten percent of the rated dynamo torque.

More specifically, it will be recognized by those skilled in the art that the back emf produced in the armatures 40 and 42 is related to the speed of the armatures as sensed by the tachometer 49. In order to cause current to flow through the armatures, therefore, the applied voltage must exceed the back emf and the difference between the applied voltage and the back emf with respect to the armature resistance generally determines the armature current. With a known armature resistance and maximum rated current, a voltage range above the back emf may be determined which will correspondingly control the armature current generally through its rated range.

For example, assuming that this voltage range is approximately eight percent of the available battery voltage, it will be seen that by applying an armature voltage which is the sum of the back emf and one-half of the voltage range or approximately four percent of the available battery voltage, approximately one-half of the rated armature current will be caused to flow through the armature thus proportionally producing approximately one-half of the rated dynamo torque.

Thus, the signal processor 12 utilizes the tachometer 49 signal as a representation of the back emf within the dynamo armatures 40 and 42. The signal processor 12 further utilizes the accelerator position signal to indicate the voltage difference that must be added to the back emf so as to cause an armature current with respect to rated armature current to be substantially proportional to the accelerator position with respect to the total accelerator travel range.

For example, continuing to assume that the accelerator has been depressed ten percent, and further continuing to assuming that eight percent of the battery terminal voltage will cause the rated armature current to flow through the armature resistance, the signal processor 12 responds to the tachometer signal and the accelerator position signal so as to provide a control signal to the armature chopper 44 which in turn provides a voltage across the armatures 40 and 42 which is substantially eight-tenths of one percent of the battery terminal voltage greater than the back emf. This difference between the armature voltage and the back emf causes approximately ten percent of the rated armature current to flow and thus produces ten percent of the dynamo rated torque in response to a ten percent depressed accelerator pedal position.

As the speed of the dynamos increases, the tachometer signal increases proportionally and the signal processor 12 in turn adjusts the armature chopper 44 duty cycle so as to maintain this voltage difference between the voltage applied to the armatures and the back emf.

As is to be appreciated, the vehicle will reach an equilibrium speed wherein the torque produced by the dynamos 32 and 34 is substantially equal to the torque required to propel the vehicle along at the equilibrium speed. However, the signal processor 12 will continue to operate the chopper 44 so as to control the torque produced by the dynamos 32 and 34 substantially in proportion to the accelerator position signal. Thus, for example, if the accelerator position is increased to 50 percent of the accelerator pedal travel range, then the signal processor 12 will operate in the above-described manner such that the dynamos 32 and 34 will provide substantially 50 percent of their rated torque capacity. In this way, the operation of the accelerator substantially corresponds to the operation of the accelerator in a conventional automobile which may be powered, for example, by means of an internal combustion gasoline engine.

It is to be noted that the signal processor 12 continues to adjust the field chopper 24 so as to generally maintain the optimum field current for a given torque-speed operating point. A more detailed description of this function of the signal processor 12 is made below with reference to FIGS. 3 and 4.

Those skilled in the art will appreciate that the voltage applied by the field and armature choppers 24 and 44 across the fields 36,38 and the armatures 40 and 42 respectively is substantially proportional to the duty cycle of the choppers.

Assuming now that the accelerator pedal is released and that the brake pedal is depressed a portion of its travel range, the brake position signal from the brake potentiometer 14 causes the signal processor 12 to operate in the following fashion. The signal processor 12 controls the field and armature contactor logic 22 which in turn controls the field reversing contactors 28 so as to reverse the direction of field current flow. In a preferred embodiment, the power from the battery 48 is connected to cause the current to first flow through the field 36 and then the field 38 to the field chopper 24. Additionally, the field and armature contactor logic 22 controls the armature contactors 30 to connect the armature 42 to ground. The dynamos 32 and 34 thus connected in this manner function as generators during forward motion of the vehicle.

With the brake position signal present, the signal processor 12 controls the field chopper 24 to provide a preset current flow through the fields 36 and 38.

The signal processor 12 also utilizes the brake position signal to control the pulse width, that is, duty cycle of the armature chopper 44 in a manner analogous to that previously described to thereby substantally control the regenerative braking current generated by the dynamos 32 and 34 and to thus proportionally, control the braking torque.

It is to be noted that the armature chopper 44 when the dynamos 32 and 34 are operating as generators alternately short the armatures 42 and 44 in series to ground and then open the armature circuit. The length of time that the armatures are shorted is determined by the operating frequency of the armature chopper 44 and by the pulse width of the chopper as controlled by the signal processor 12. When the armatures are shorted, the induced back emf within the armatures 40 and 42 will cause current to build up within the armatures within a circuit from ground through the armature contactors 30, the armatures 42 and 40 and to ground through the armature chopper 44. Once the armature chopper 44 opens the circuit to ground, the collapsing field within the armatures 40 and 42 creates a voltage surge within the armatures thereby allowing the armatures to discharge their stored inducted energy through a commutator or fly wheel diode within the armature chopper 44 to the positive terminal of the main battery 48, thus causing current to flow into and charge the battery.

As will be apparent to those skilled in the art, the energy stored within the inductance of the armatures 40 and 42 is directly proportional to the length of time the armature chopper 44 shorts the circuit to ground and is thus proportional to the pulse width or duty cycle of the chopper. It will also be apparent to those skilled in the art that as the speed of the armatures 40 and 42 increases, a decreasing pulse width is required to store the same amount of energy in the armature inductance and thus the pulse width must be decreased if constant generated current from the armatures 40 and 42 is desired. Additionally, the pulse width or duty cycle may be increased, that is, the off time of the armature chopper 44 may be decreased to thereby cause the current within the armatures 40 and 42 to step up in the fashion of a ringing choke inverter until the voltage E across the armature which is the sum of the voltage caused by the current through the armature resistance with the induced emf may be determined by the following relationship: E×time on=(Battery terminal voltage −E)×time off.

Furthermore, assuming that the rated current through the armatures 40 and 42 is achieved when approximately eight percent of the battery terminal voltage is applied across the armature resistance, it will be seen that the current generated by the dynamos 32 and 34 may be controlled from some minimum current through a range to the rated armature current by increasing the pulse width approximately eight percent.

Thus still assuming that approximately eight percent of the battery terminal voltage across the armature resistance causes the rated armature current to flow, the signal processor 12 in response to the tachometer signal and the brake position signal controls the armature chopper 44 pulse width by adjusting the pulse width or duty cycle from approximately ninety-two percent corresponding to a vehicle stopped condition to approximately zero percent in response to the tachometer signal and by adding to that tachometer-dependent pulse width an amount which increases width from zero to approximately eight percent in response to increasing brake pedal movement. Thus the dynamo generated current increases from some minimum value when the brake pedal is slightly moved to the maximum armature current rating when the brake pedal is moved through the regenerative braking range. In this way, the signal processor 12 controls the regenerative braking to more nearly simulate the braking characteristics associated with conventional hydraulic brake systems.

Once the regenerative braking system as described as reached its maximum torque limit, that is the limit of the armature current, then further movement of the brake pedal may be made to operate an auxiliarly hydraulic braking system within the vehicle.

It is to be further noted that because of the relative high frequency of the armature chopper 44 and since the chopper off time, which is to say the time that the armature circuit is open can be relatively short, and since the armatures 40 and 42 operate as a ringing choke inverter, regenerative braking control is available to essentially zero miles per hour thereby increasing the overall efficiency of the vehicle and also not requiring the operator to transistion from regenerative braking to hydraulic braking during typical braking operation.

To operate the vehicle electrically in the reverse direction, the mode switch 18 is set to REVERSE which in turn causes the signal processor 12 and the field and armature contactor logic 22 and the field reversing contactors 28 to reverse the current flowing through the fields 36 and 38. This reversed field current will then cause the armatures 40 and 42 to rotate in the opposite or reverse direction in response to the accelerator position signal as previously described. In a preferred embodiment, regenerative braking is disabled in the reverse operating mode and the vehicle brake pedal will operate the vehicle auxiliary hydraulic braking system to stop the vehicle when traveling in the reverse direction. It is to be understood, however, that by proper selection of the field current direction and by connecting the armature 42 to ground through the armature contactors 30, regenerative braking would be available when the vehicle is operated in the reverse direction as it was when the vehicle was moving forward as just described.

As the speed of the vehicle increases under electric power, the tachometer signal will indicate to the signal processor 12 that a predetermined changeover point has been reached and that the heat engine is to be engaged. The control signal from the signal processor 12 thus controls the clutch linear actuator 20 to engage the heat engine clutch and also provides the ignition signal to the heat engine ignition system. After a brief delay, the signal processor 12 controls the field and armature contactor logic 22 so as to convert the dynamos 32 and 34 from motor operation to generator operation. This conversion is identical to that just described for regenerative braking.

In this mode of operation, the signal processor 12 adjusts the field chopper 24 and thus the field current through the fields 36 and 38 so as to maintain a substantially constant load upon the heat engine near its maximum efficiency operating point. The signal processor 12 in response to the accelerator position signal inversely proportionally controls the field chopper 24 pulse width such that the current through the fields 36 and 38 decreases as the accelerator pedal position is increased through its range of travel. As the operator presses the accelerator pedal and thus requires greater torque from the heat engine to be delivered to the vehicle wheels, the torque required by the dynamos 32 and 34 in the generating mode is proportionally decreased yet the total amount of power from the heat engine remains relatively constant and desirably near the maximum operating efficiency point of the heat engine. In this way, the signal processor 12 operates the dynamos 32 and 34 as load levelers whereby the heat engine is operated substantially continuously near its maximum efficiency and any excess torque not required to meet the demands of vehicle speed or acceleration is then converted by the dynamos 32 and 34 into electrical energy which may be stored for later use. Operating the heat engine in this manner thus increases the overall efficiency of the hybrid vehicle as a system in effect resulting in the more efficient utilization of the heat engine fuel.

The signal processor 12 is also responsive to the accelerator position signal so as to detect the movement of the accelerator through the last ten percent of the accelerator travel range. In this position, the operator is demanding from the vehicle nearly the maximum overall power available. However, assuming that the heat engine was chosen for a minimum fuel consumption, it is likely that the heat engine will be unable to provide the power desired by the operator. Thus, with the accelerator in this position, the signal processor 12 converts the dynamos 32 and 34 from generators to motors, and, if the tachometer signal indicates that it is safe to do so, energizes the dynamos 32 and 34 as motors to supply additional driving torque to the vehicle wheels. In this way, a form of passing gear or maximum vehicle output power is achieved.

Now assuming that the vehicle has been operated with the heat engine and that the speed of the vehicle has decreased to a limit where the dynamos 32 and 34 are desired to propel the vehicle, the signal processor 12 in response to the tachometer signal provides a control signal to the clutch linear actuator 20 to thereby disengage the clutch and to remove the ignition signal from the heat engine ignition system. The signal processor 12 will then operate as previously described to control the operation of the dynamos 32 and 34 as motors. It is to be recognized, of course, that regenerative braking is available when the vehicle is propelled either by the electric dynamos or by means of the heat engine.

Figure 2:
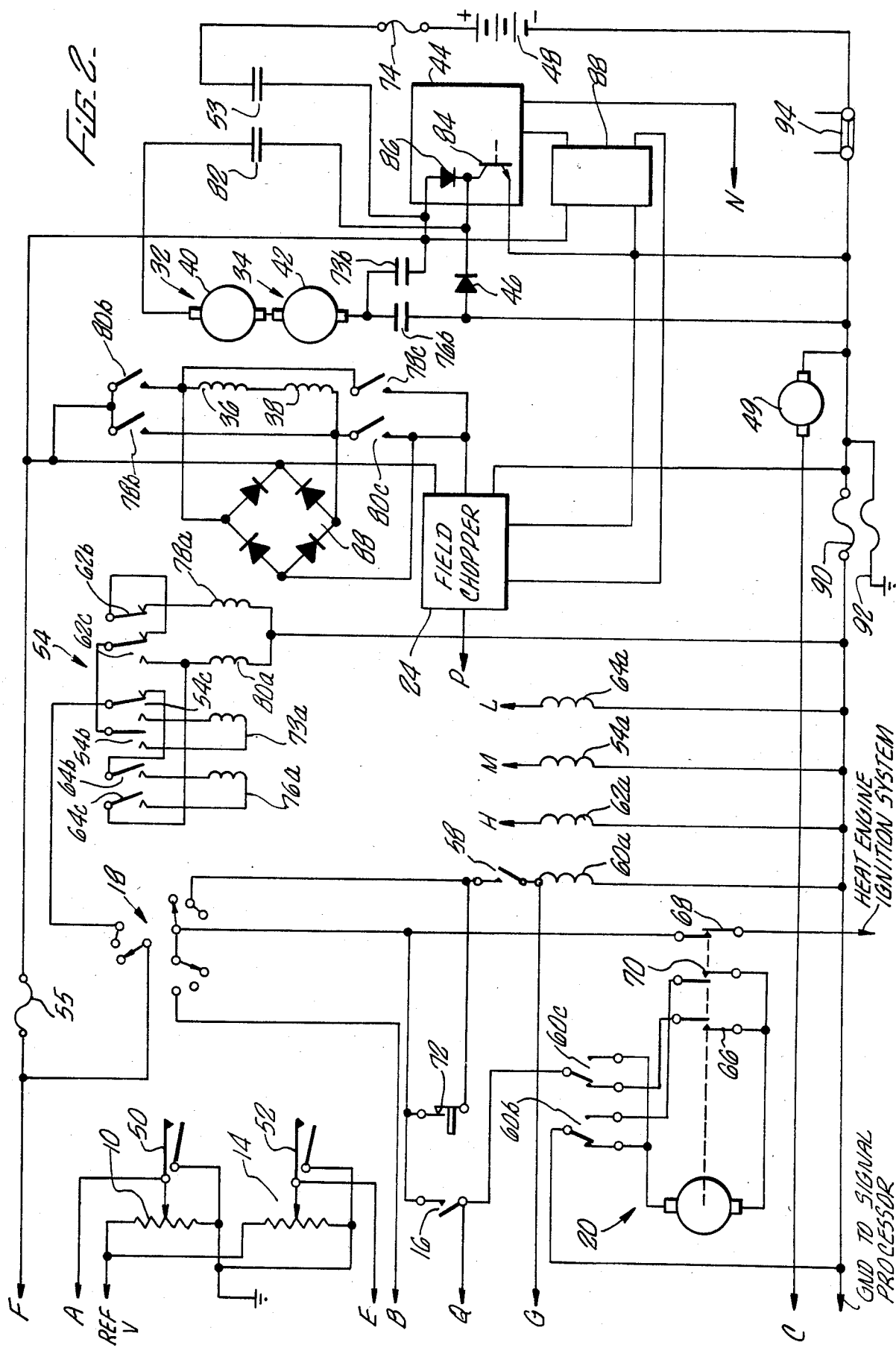
FIG. 2 is a schematic diagram of a portion of the control system of FIG. 1.

With reference now to FIGS. 2 and 3, the accelerator potentiometer 10 is connected from a reference voltage to ground as is the brake potentiometer 14. In a preferred embodiment, the accelerator and brake potentiometers 10 and 14 respectively, are each dual section potentiometers which are operated in parallel to thereby eliminate faulty spots within the potentiometer resistive elements that may cause discontinuities in the output signals and thus irregular operation of the accelerator and brake pedals. Additionally, two microswitches 50 and 52 are connected from the center wipers of the potentiometers 10 and 14 to ground so as to be closed when the potentiometers are at the minimum position. These microswitches 50 and 52 assure that ground signals will be applied to the respective potentiometer output lines when the potentiometers are adjusted to a minimum position and in this way prevent run away operation of the vehicle as would occur if the potentiometers 10 or 14 were to fail. The output from the potentiometer 10 is applied to an accelerator potentiometer buffer 200 which in turn provides a scaled accelerator signal on a line 201 to an accelerator brake gate 202 and to a by-pass gate 204. The buffer 200 also supplies a second scaled accelerator signal to a tachometer signal mixer 206.

The accelerator potentiometer buffer 200 (FIG. 4b) includes a DC amplifier 304 to which the accelerator input signal is applied through a resistor 306. The output of the amplifier is applied through a Darlington transistor combination 308 to provide the first scaled accelerator output signal. The potentiometers 310 and 312 may be adjusted so as to scale the output of the first accelerator signal. In a preferred embodiment, the accelerator signal may be scaled to a ten-volt DC range for the full travel of the accelerator pedal. A second potentiometer 314 cooperates with a plurality of resistors in a well known fashion to provide a second scaled accelerator signal which is proportional to a percentage of the first scale signal. An input filter formed by a capacitor 316 and a resistor 318 reduce the noise from accelerator pedal vibration which may cause quick changes in the associated control circuits and dynamo current at frequencies greater than approximately two or three Hz.

Figure 4A:
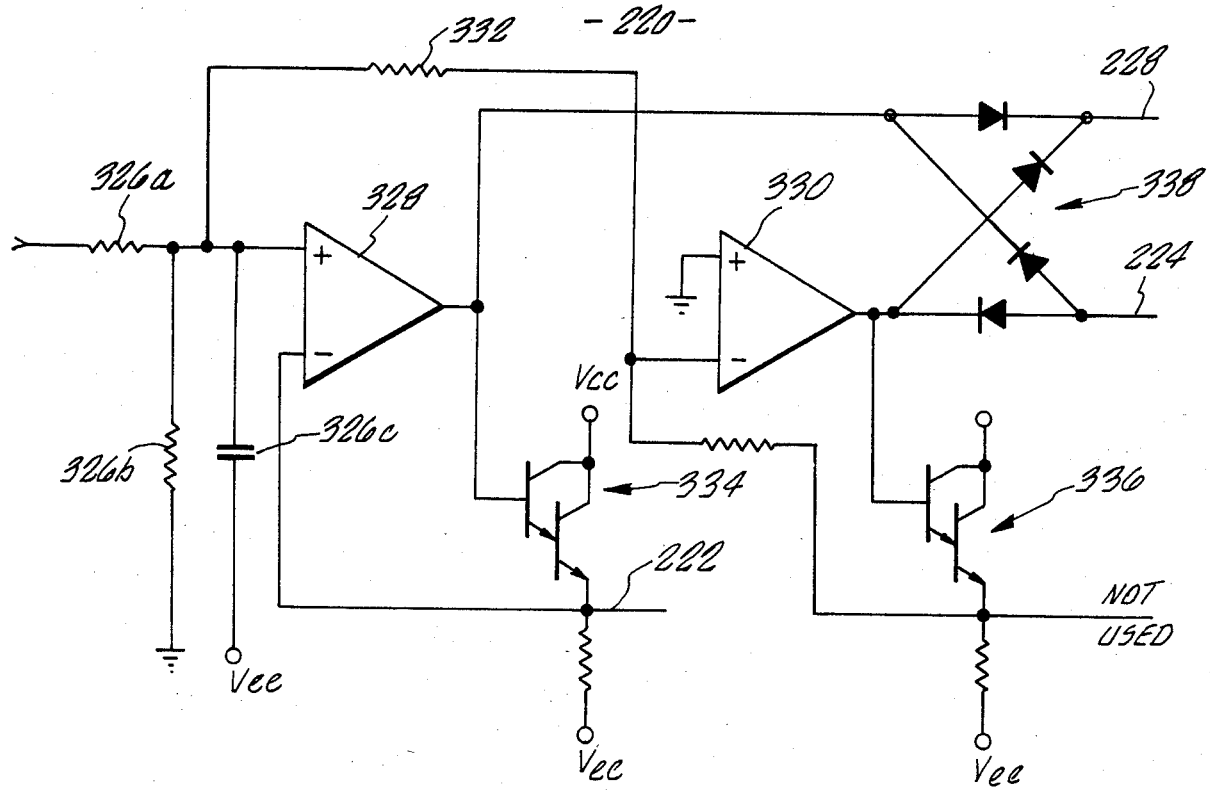
FIGS. 4a to 4q are detailed schematic diagrams of the principal blocks of FIG. 3.
Figure 4B:
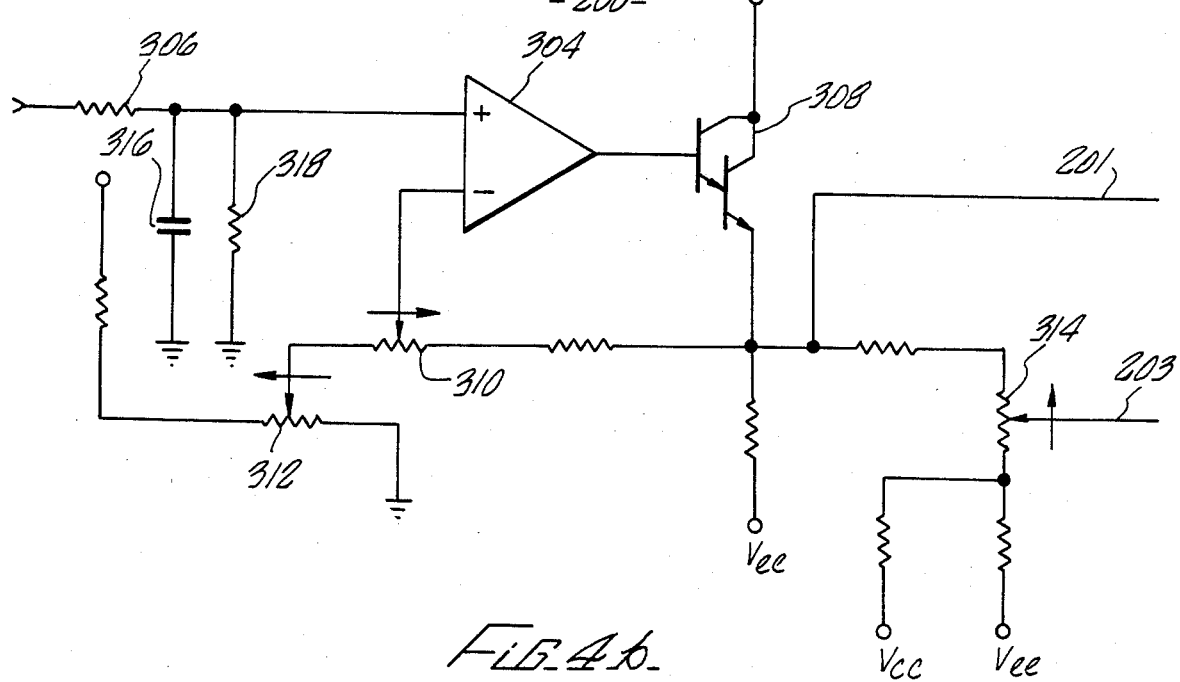
Figure 4C:
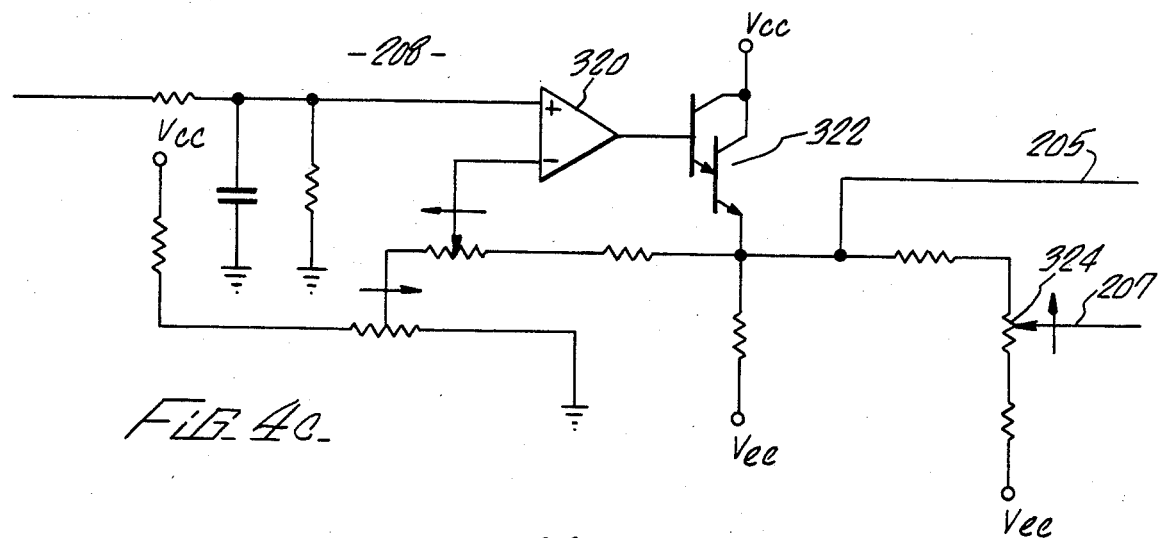

The signal from the center wiper of the brake potentiometer 14 is applied to a brake potentiometer buffer 208 (FIGS. 2, 3 and 4c). The brake potentiometer buffer 208 (FIG. 4c) is substantially similar to that used for the accelerator potentiometer buffer 200. Thus, in the like fashion, a DC amplifier 320 in combination with a Darlington transistor 322 and a scaling potentiometer 324 provide a first and second scaled brake pedal position signal on lines 205 and 207 respectively as previously described.

The accelerator-brake gate 202 generates an accelerator and brake gate signals on lines 209 and 211 which are applied to a gating logic circuit 210.

Figure 4D:
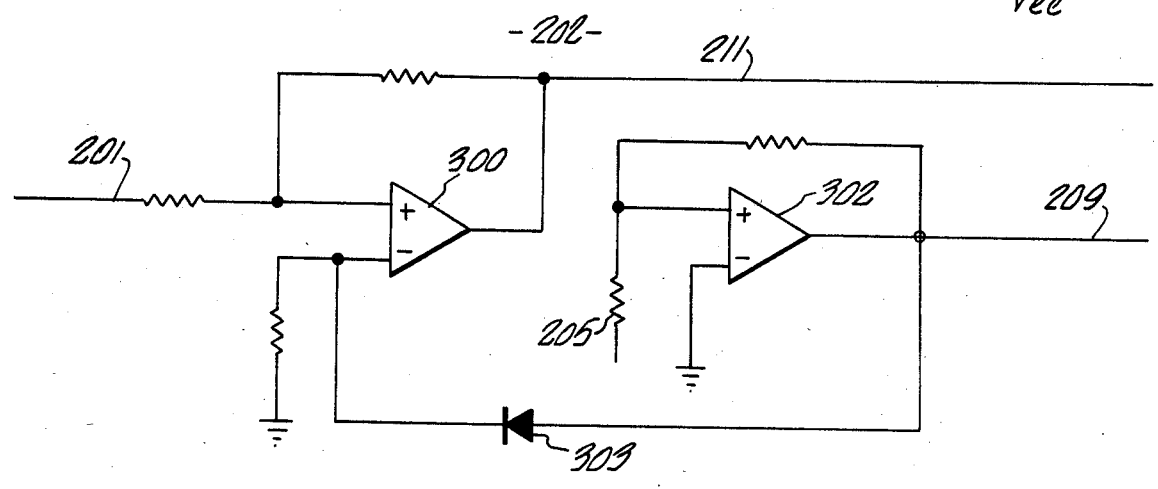

As may be seen with respect to FIG. 4d, the accelerator brake gate 202 includes two amplifiers 300 and 302 which are connected as voltage comparators. If neither accelerator nor brake pedal has been depressed, the slightly negative signals from the buffers 200 and 208 on the lines 201 and 205 will generate low-level accelerator and brake gate signal outputs. If either pedal is slightly depressed, the corresponding gate signal, will become a high level. However, if both pedals are depressed, as indicated by the signals from the buffers 200 and 208, then the brake gate signal from the comparator 302 as applied through a diode 303 to the inverting input of the comparator 300 will cause the accelerator gate signal on the line 211 to become low while the brake gate signal on line 209 may remain high, thus assuring that both modes of operation may not be simultaneously engaged.

The ignition switch 16 (FIG. 2) connects +12 volts DC from a secondary battery 56 to two rotatable contacts of the switch 18 and to the power supply of the signal processor 12 (FIG. 3). A first rotatable contact (FIG. 2) connects this ignition power to an override switch 58. A second rotatable contact of the switch 18 (FIG. 2) connects power from the ignition switch 16 to a reverse comparator 218 (FIG. 3). Lastly, a third rotatable contact of the switch 18 connects +48 VDC from the main battery 48 as applied through a fuse 74, circuit breaking device 53 and a fuse 55 to a contact pair 54c which will be subsequently described.

The tachometer 49 (FIG. 2) provides a signal to a tachometer signal buffer 220 which is proportional to the shaft speed of the dynamo 34. The tachometer signal is preferably linear and may be calibrated directly with respect to the speed of the vehicle. The polarity of the signal indicates direction of tachometer 49 rotation. The tachometer signal is applied to an R-C network (FIG. 4a) comprising two resistors 326a and 326b and a capacitor 326c which filter electrical noise. The resulting signal is applied to a unity gain non-inverting amplifier 328 and to an inverting unity gain amplifier 330 through a resistor 332. The output of the amplifiers 328 and 330 are applied respectively to Darlington transistors 334 and 336. The Darlington transistor 334 in turn provides a scaled signal directly proportional to tachometer speed on a line 222 to a heat engine and reverse comparator 218 (FIG. 3) and to the bypass gate 204. The transistor 336 (FIG. 4a) similarly provides a signal which varies from, for example, zero to −10 volts DC in proportion to tachometer speed. A the diode bridge 338 sums the output of the amplifiers 328 and 330 in a well known fashion to provide a first signal on a line 224 (FIG. 3) which may vary, for example, from zero to −10 volts DC in proportion to tachometer speed for either direction of tachometer rotation. The signal on the line 224 is applied to the tachometer signal mixers 206 and to a field control output 226. A second signal from the diode bridge 338 (FIG. 4a) which may vary for example from zero to +10 volts DC in proportion to tachometer speed for either direction of tachometer rotation. The signal is applied on a line 228 (FIG. 3) to the tachometer signal mixers 206. Thus the signal on the line 222 is a positive or negative signal which varies proportionally with the tachometer rotation in the forward or reverse directions respectively. The signals on the lines 224 and 228 however do not change polarity with respect to the direction of tachometer rotation.

The bypass gate 204 (FIGS. 3 and 4f) accepts the first scaled accelerator signal from the line 201 and applies this signal through a resistor 340 to the non-inverting input of a comparator 342 which is operated in a conventional fashion. A voltage divider formed by two resistors 344a and 344b provides a selected voltage to the inverting input of the comparator 342 and through a resistor 346 to the non-inverting input of a comparator 348 which is operated in a manner similar to that of the comparator 342. The tachometer signal from the line 222 is applied to the inverting input of the comparator 348. The comparator 342 provides a bypass gate output signal on a first line 230 to the gating logic 210, the signal appearing when the accelerator pedal is pushed to greater than 90 percent of its range of travel. The comparator 348 similarly generates a high-level signal on a line 232 when the tachometer signal indicates that the vehicle speed is less than, for example, 55 miles per hour in the forward direction.

The heat engine and reverse comparator (FIGS. 3 and 4g) includes a first and second comparator 326 and 350 respectively. The signal from the buffer 220 appearing on the line 222 which is proportional to tachometer speed is applied through a resistor 352 to the non-inverting input of the comparator 326. A voltage divider 354 including a potentiometer 354a provides an adjustable signal to the inverting input of the comparator 326. When the tachometer signal exceeds the adjustable signal from the potentiometer 354a which is adjusted to correspond to a vehicle speed at which it is desired to transfer from electric propulsion to heat engine propulsion, the comparator 326 generates a high-level signal which is applied through a line 219 to a photoisolator and driver 234 which provides operating voltage to a relay coil 60a (FIG. 2) operating the corresponding relay normally closed contact pairs 60b and 60c and the clutch linear actuator 20 as is to be described below.

Figure 4E:
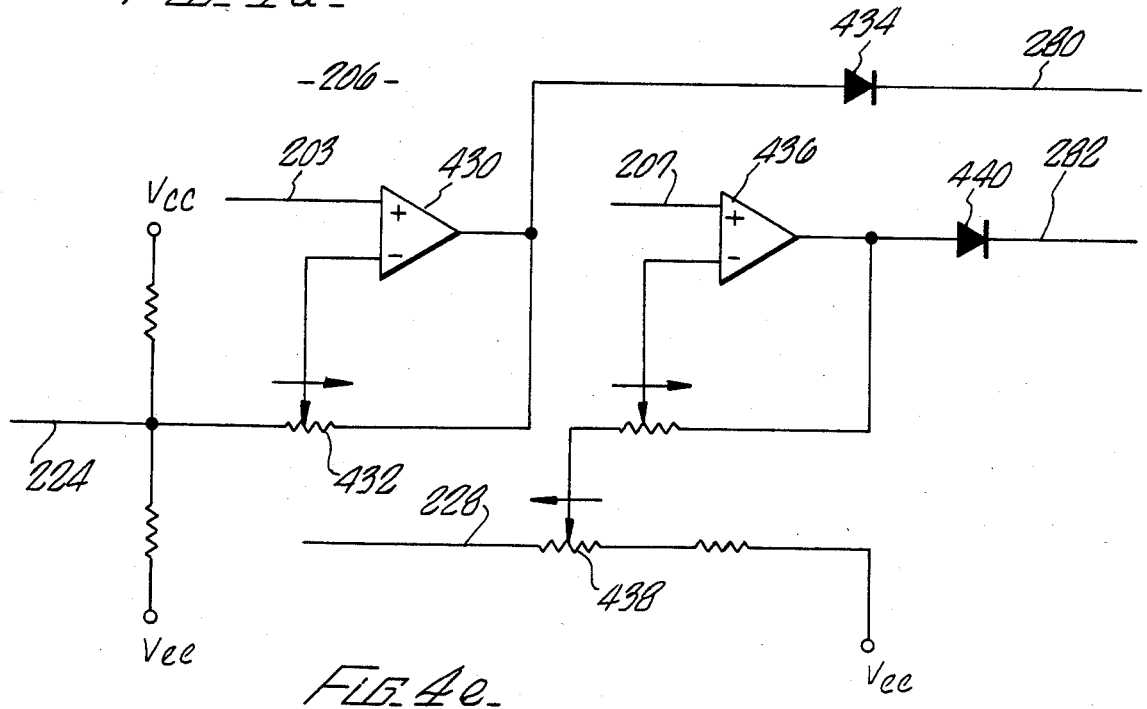
Figure 4G:
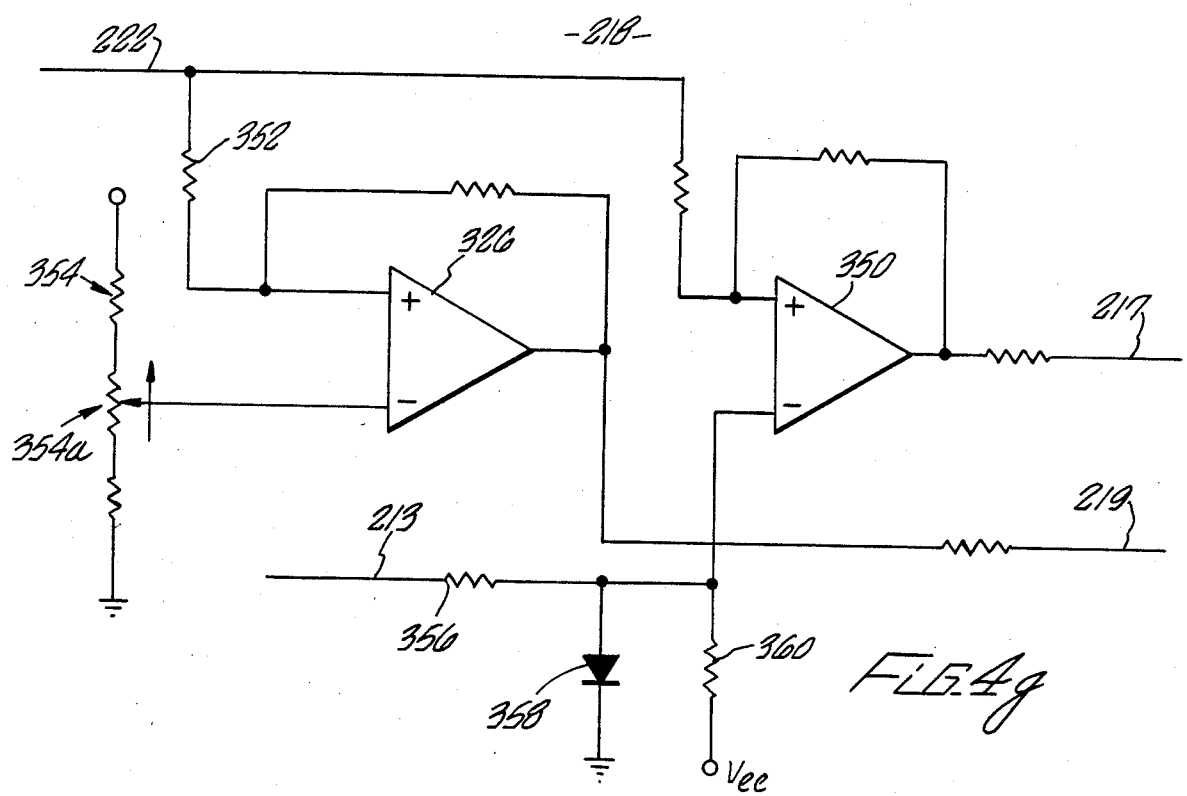

With continued reference to FIG. 4g, the comparator 350 receives the reverse input signal from the line 213 which is it will be recalled a +12 VDC signal from the switch 18 of FIG. 2. This twelve volt signal is applied through a resistor 356, a threshold-determining diode 358 and resistor 360 to the inverting input of the comparator 350. The comparator 350 in response to the signals generates a high-level signal which is applied to a line 217 (FIG. 3) and to the photoisolator and driver 214 when the switch 18 is in the reverse position and there is no forward motion of the vehicle, that is, the tachometer signal on the line 222 is less than zero VDC. This prevents the signal processor 18 from enabling the dynamos 32 and 34 to operate in the reverse direction as motors if the vehicle still has some forward speed. The signal from the photoisolator and driver 214 is applied to a relay coil 62a which operates the contact pairs 62b and 62c (FIG. 2).

Figure 4H:
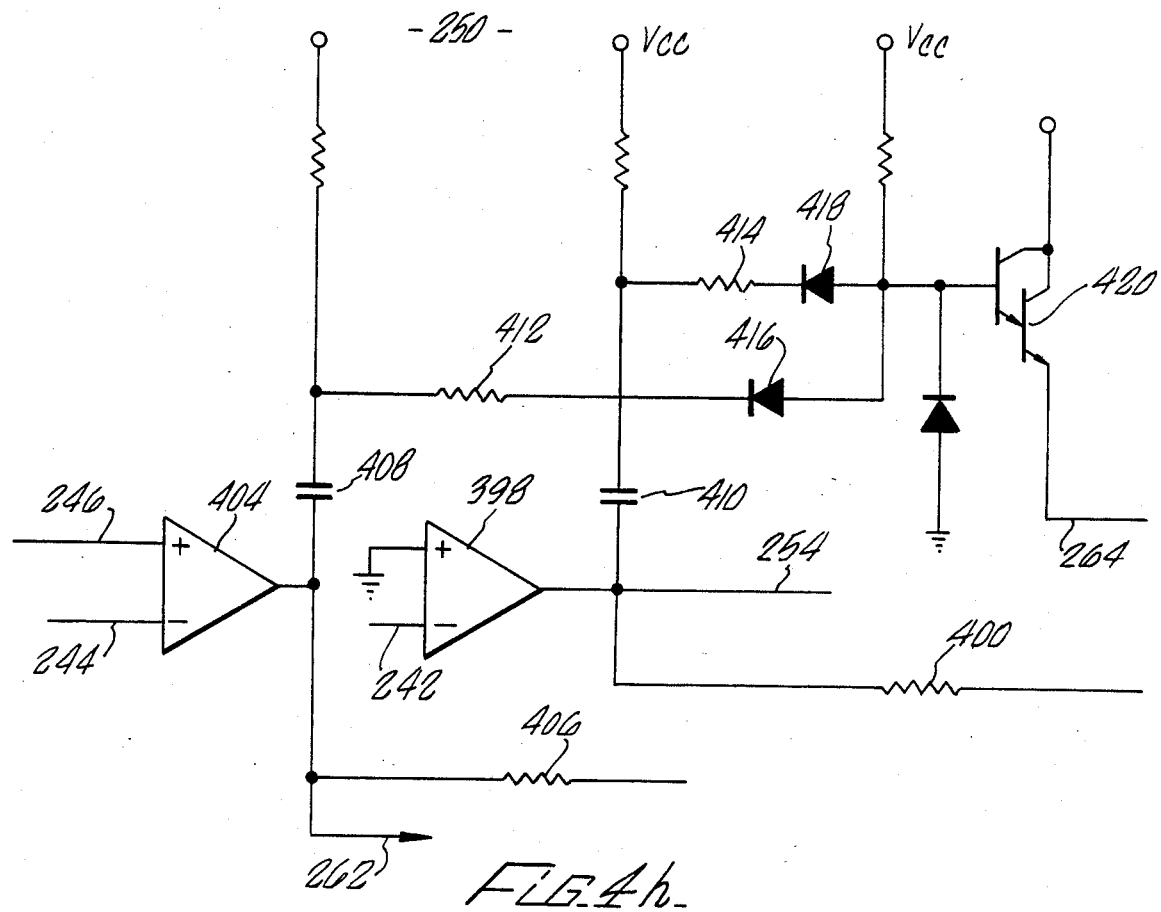
Figure 4I:
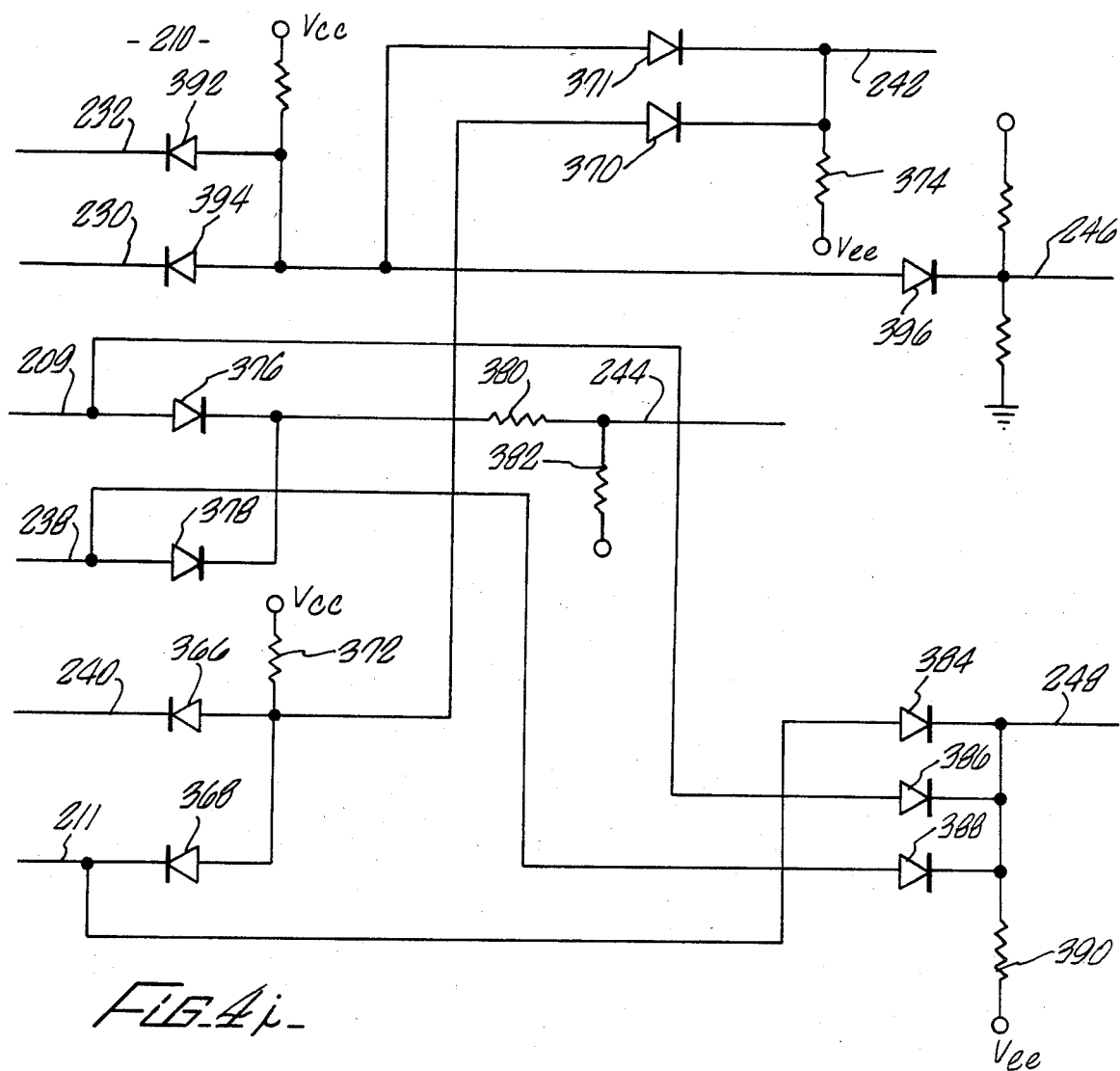
Figure 4J:
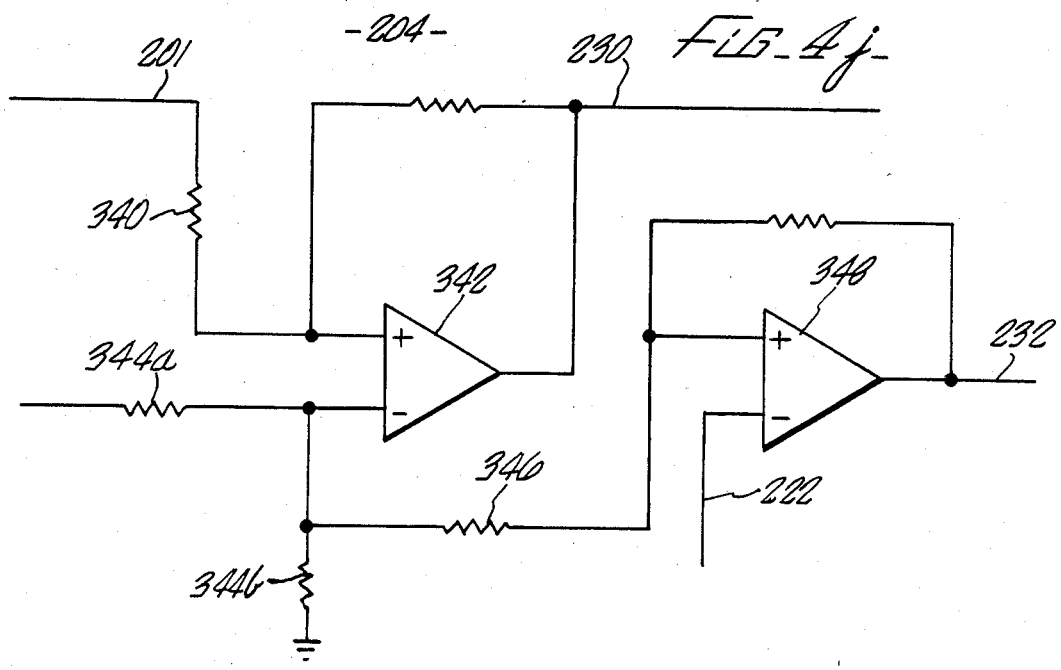
Figure 4K:
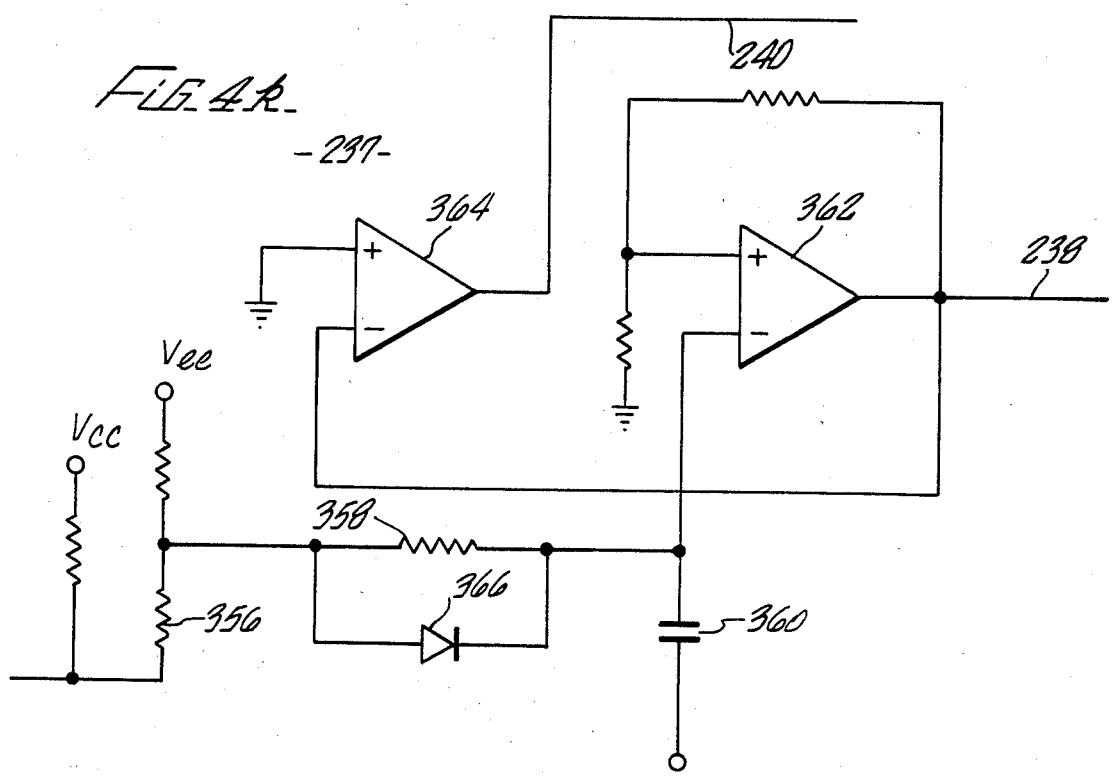
Figure 4M:
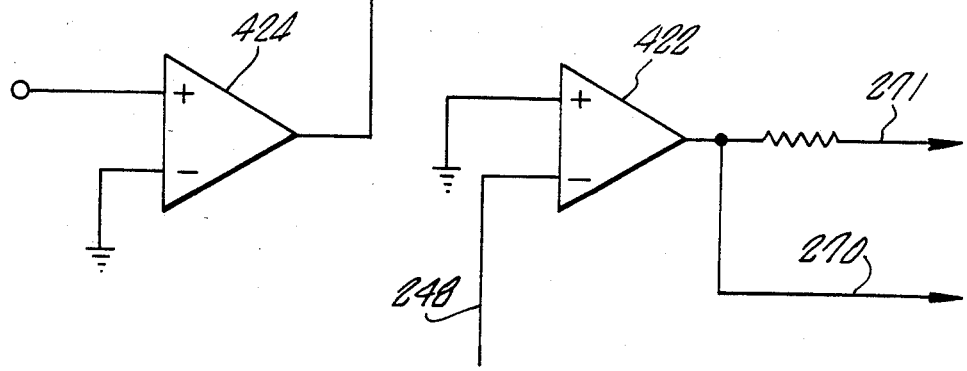
Figure 4M:
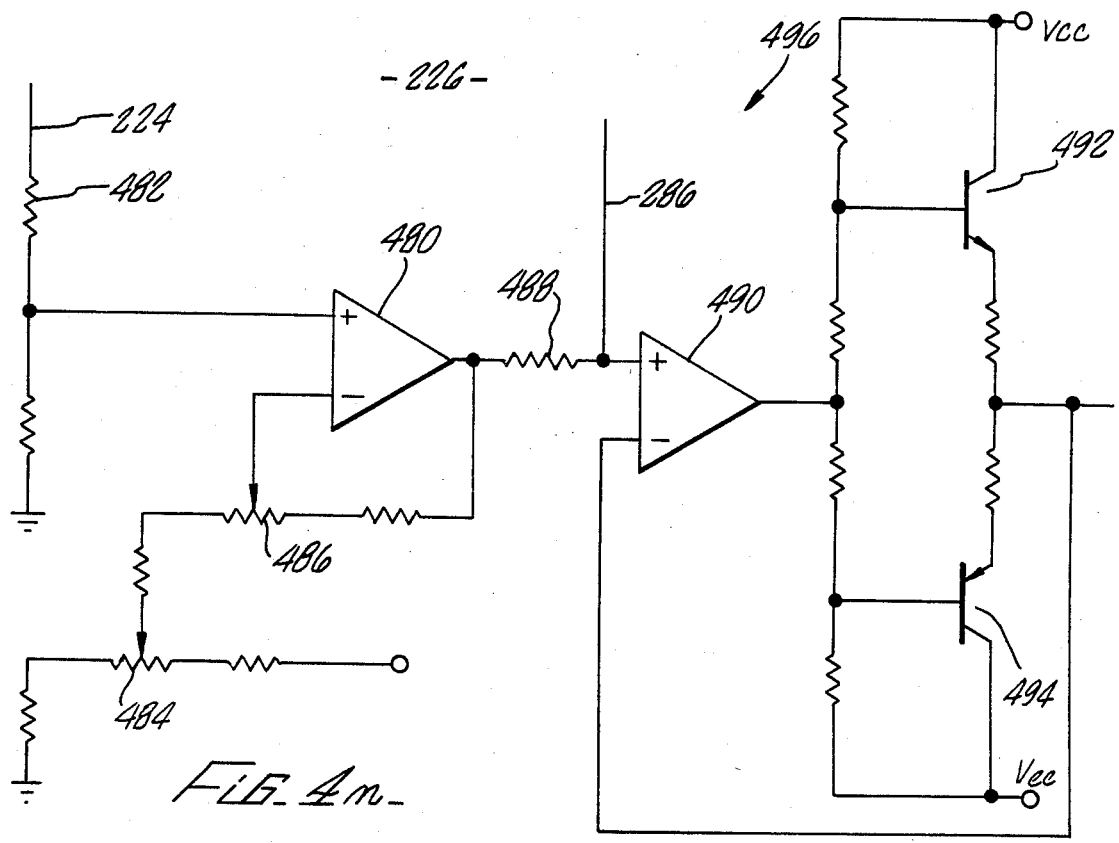
Figure 4P:
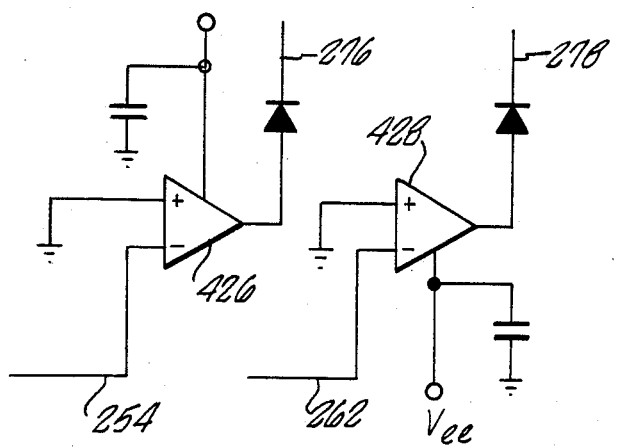
Figure 4Q:
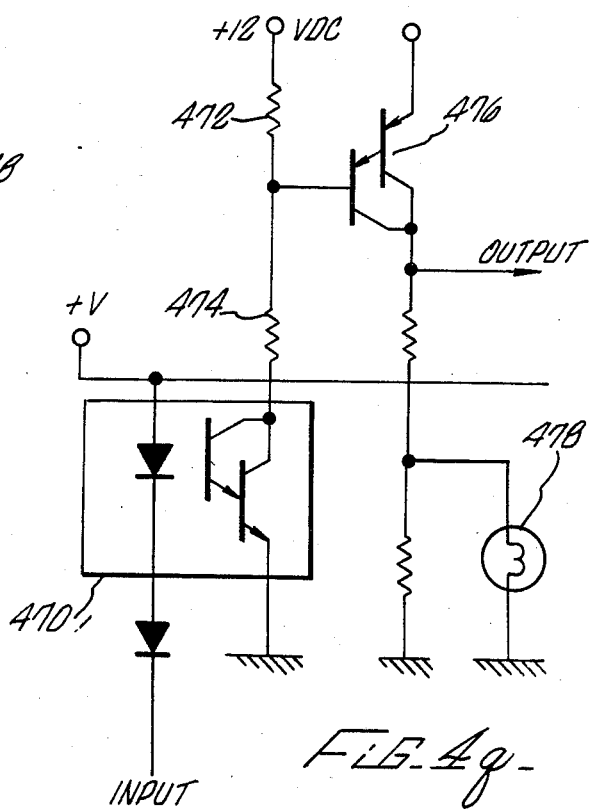

The drive output from the photoisolator and driver 234 is also applied through a photoisolator 236 to the heat engine delay gate 240 (FIGS. 3 and 4k). The signal appearing at the input of the photoisolator 236 is high when the drive signal from the driver 234 drives the relay coil 62a and thus causing the heat engine clutch to be disengaged. The signal is applied through resisters 356 and 358 and across a capacitor 360 to a comparator 362. Assuming that the signal from the isolator 236 is initially high indicating that the heat engine clutch is disengaged, the comparator 362 will generate a low-level output signal on a line 238 to the logic 210. This signal is inverted by a second comparator 364 and is applied on a line 240 from the gate 237 to the logic 210. Assuming now that the heat engine clutch is to be engaged, the signal from the isolator 236 becomes low and after a delay as determined by the discharge time of the capacitor 360, the signals on the lines 238 and 240 will invert. This delay insures that the heat engine has time to start after the clutch is engaged before the dynamos 32 and 34 are inverted from motors to generators. Now assuming that the heat engine clutch is to be disengaged, the signal from the photoisolator 236 will become a high-level signal which will charge the capacitor 360 relatively quickly through a diode 366 which is in parallel with the resistor 358. Thus the transition from heat engine operation of the vehicle to electric drive is accomplished relatively quickly.

The gating logic 210 (FIGS. 3 and 4i) determines the logical conditions which must exist before a motor signal on a line 242, a generator signal on a line 244, a by-pass signal on a line 246, or a field on signal on a line 248 are generated. The diodes 366, 368 and 370 and the resistors 372 and 374 cooperate in a well known fashion to provide a motor gate output on the line 242 when the input signals on the lines 240 and 211 are both high, indicating that the heat engine is off and that the accelerator pedal has been depressed. The generator gate signal on the line 244 is similarly produced by two diodes 376 and 378 and two resistors 380 and 382 when either of the signals on the lines 209 or 238 are high, indicating either that the brake pedal has been depressed or that the heat engine clutch has been engaged and thus that the heat engine is providing motive power to the vehicle.

Continuing with FIG. 4i, three diodes 384, 386 and 388 in cooperation with a resistor 390 provide a field gate signal on the line 248 when any of the signals on the lines 209, 238 or 211 are high, that is, whenever the brake pedal is slightly depressed, the heat engine clutch is engaged, or the accelerator pedal is slightly depressed, corresponding to operating conditions requirng that a field be applied to the dynamos 32 and 34. The bypass gate signal on the line 246 is provided by three diodes 392, 394 and 396 and the associated resistors whenever both signals on the lines 232 and 230 are both high, indicating that the vehicle is traveling less than 55 miles per hour and that the accelerator pedal is depressed greater than ninety percent of its travel range.

Lastly, a diode 371 cooperates with the diodes 392 and 394 to provide a motor gate signal on the line 242 when the bypass signal on the line 246 becomes high, thus allowing the dynamos 32 and 34 to be converted to motor operation to thereby assist the heat engine in propelling the vehicle.

The signals appearing on the lines 242, 244, 246 are applied to a motor-generator 250 (FIGS. 3 and 4h). The motor signal appearing on the line 242 is inverted by a comparator 398 and this signal is applied through a resistor 400 to a photoisolator and driver 252 which in turn applies a drive signal to the relay coil 54a of FIG. 2. Thfs inverted motor signal is also applied through a line 254 to an armature gate inverter 256 and to a charger field control 258. The by-pass gate signal on the line 246 and the generator gate signal on the line 244 are applied to the non-inverting and inverting inputs respectively of a second comparator 404 which generates an inverted generator gate output that is applied through a resistor 406 to a photoisolator 260. The isolator 260 in response to the low-level signal generates a drive signal which is applied to a relay coil 64a which operates corresponding contact pairs 64b and 64c, the operation of which will be more fully described below.

The comparator 404 also provides an inverted generator signal via a line 262 to the armature gate inverter 256. Additionally, the comparator 404 is responsive to the by-pass signal on the line 246 such that when the by-pass signal becomes a high-level indicating that the dynamos 32 and 34 are to be operated as motors to assist in the propulsion of the vehicle while the heat engine is operating, then the comparator 404 changes states removing the inverted generator output signal. It is to be noted that the resistor 380 (FIG. 4i) provides the difference in voltage levels of the signals on the lines 244 and 246 required to perform this last described function.

With further reference to FIG. 4h, two capacitors 408 and 410 in combination with two resistors 412, 414 and two diodes 416 and 418 drive the Darlington transistor 420 so as to produce a delay gate signal at the output thereof which is applied through a line 264 to an armature control 266.

A field and clutch gate 268 (FIGS. 3 and 4m) includes a first inverter 422 which inverts the field gate signal on the line 248 to provide a low-level signal on the line 270 to the armature control 266. The field and clutch gate 268 includes a second inverter 424 which is not used in the present embodiment.

The armature gate inverter 256 (FIG. 3 and FIG. 4p) includes two inverters 426 and 428 which invert the motor and generator signals from the comparator 250 applied by the lines 254 and 262 respectively. The output of the comparators 426 and 428 are applied through lines 276 and 278 respectively to the armature control 266.

Continuing now with a detailed description of the circuitry and in particular with respect to the tachometer signal mixer 206 (FIGS. 3 and 4e), the mixer 206 mixes, in proper proportion, the tachometer signals and the brake and accelerator pedal signals for correct control of the armature current. A first mixing amplifier 430 provides a signal which is proportional to the sum of the signal appearing on line 224 which is a negatively increasing signal proportional to tachometer speed with the second scaled accelerator signal appearing on the line 203. The signal on the line 224 is applied through a potentiometer 432 to the inverting input of the amplifier 430 thus increasing the amplifier 430 output as the signal becomes more negative. The proportion by which the accelerator signal on the line 203 is mixed with the tachometer signal on the line 224 is set by means of the adjustment potentiometer 432 and the resulting signal is applied through a diode 434 on a line 280 to the armature control 266.

It is to be recalled that the tachometer signal is proportional to the back emf within the dynamo armatures and that the accelerator signal is proportional to the desired torque produced by the dynamos when operating as motors. Thus by summing the signals in a proportion determined by the potentiometer 432, the mixer 430 provides a signal on the line 280 which is proportional to the voltage that is to be applied to the dynamos so as to overcome the back emf and to thereby cause the desired current to flow through the dynamo armatures 40 and 42 as was previously described.

Similarly, and with further reference to FIG. 4e, a second mixer 436 mixes the brake signal from the line 207 with the signal on the line 228 which is a signal of positive polarity and which is proportional to the speed of the tachometer regardless of tachometer direction. The mixer 436 mixes the signals such that as the tachometer speed increases, the output of the mixer 436 decreases and that the output is increased with the application of the brake signal on the line 207. A potentiometer 438 determines the mix ratio of the signals. It will again be remembered that the tachometer signal is proportional to the back emf within the dynamo armatures 40 and 42, and that as the back emf decreases during regenerative braking, the pulse width of the associated armature chopper 44 must correspondingly increase. However, as the brake pedal is applied, the pulse width of the choppers, that is, the on time, is to increase so as to thus decrease the off time and thus allow the armature current to increase in a manner similar to that of a ringing choke inverter. It is thus seen that the mixer 436 accomplishes this result. Additionally, it is to be recognized that the mixer 430 similarly adds the accelerator signal on the line 23 to the tachometer signal on the line 224 in such a proportion as to increase the armature chopper 44 pulse width, thus increasing the voltage across the armatures and increasing the current therethrough.

The output from the mixer 436 is applied through an isolation diode 440 to a line 282 which is in turn applied to the armature control 266 (FIG. 3).

Again with reference to FIG. 3 and now with reference to FIG. 4f, the armature control 266 operates to select a correct analog voltage applied to it and to adjust the analog voltage to match the input requirements of the armature chopper 44 (FIG. 2). The armature control 266 is further responsive to a plurality of control signals as is now to be described.

The brake signal on the line 282 and the accelerator signal on the line 280 are applied to respective analog switches 442 and 445 which are in turn connected to a third analog switch 446. The output of the analog switch 446 is applied across an armature gain adjustment potentiometer 448 which is then connected to the non-inverting input of an amplifier 450. The amplifier 450 in combination with the transistors 452 and 454 operate together as a output line amplifier 456. The transistors 452 and 454 are connected in a well known complementary emitter-follower configuration to provide an output signal on a line 284 which is applied to the armature chopper 44 (FIGS. 1 and 2) so as to control the duty cycle or pulse width of the chopper. The gain of the amplifier 256 is established by adjusting the potentiometer 448 and the amplifier offset voltage may be adjusted by adjusting a potentiometer 458 which is connected as a portion of a voltage divider. The output of the potentiometer 458 is connected to the inverting input of the amplifier 450 along with the signal from an analog switch 460. A resistor 462 connected to the Vcc supply provides a voltage through the switch 460 and through a resistor 464 to the inverting input of the amplifier 450 along with the signal from the offset adjustment potentiometer 458. When the field gate signal on the line 270 is applied through a diode 466 to the control terminal of the switch 460, the switch connects the resistor 462 to the resistor 464 and to a capacitor 468, quickly charging the capacitor and forcing the output of the amplifier 450 to a low-level signal. However, when the field signal on the line 270 becomes a low-level the switch 460 opens and the capacitor 468 discharges relatively slowly through the resistor 464 and thus for approximately one second in a preferred embodiment the output of the amplifier 456 continues to be low-level signal, thus allowing the dynamo field coils to establish the required field within the dynamos.

Now with respect to the logic functions performed by the armature control 266, the switch 442 applies the brake signal on the line 282 to the switch 446 when the generator signal on the line 278 is high, to thereby control the armature chopper in response to the brake signal. Conversely, the motor signal on the line 276 applies the accelerator signal the line 280 through switch 448 to the switch 446 to thereby cqntrol the armature chopper 44 in response to the accelerator signal on the line 280 when the dynamos 32 and 34 are operated as motors. The delay signal on the line 264 which may last, for example, for approximately one-half second, interrupts the signal through the switch 446 for approximately this length of time when the dynamo operating mode is transferred from motor operation to generator operation to prevent the armature contactors 30 from arcing.

The photoisolators and drivers 234, 214, 274, 212, 260 and 252 each include a photoisolator 470 (FIG. 4q) which allows current to flow through the resistors 472 and 474 when a low-level signal is applied to the input of the photoisolator 470. The base of a Darlington transistor 476 is connected between the resistors 472 and 474 and when biased in a forward condition by the current flowing through the respective resistors, applies a +12 VDC output drive signal and also illuminates an indicator lamp 478. The photoisolator drivers thus provide a drive signal in response to a low-level input.

The charger field control 258 and the field control output 226 cooperate to provide to the field chopper 24 (FIG. 2) a signal which controls the pulse width or duty cycle of the chopper. More specifically, the contrl signal causes the dynamo field current to be substantially the field current which will operate the dynamos when used as motors at peak efficiency as a function of the substantially instantaneous speed and torque as determined by the tachometer 49 and the position of the accelerator potentiometer 10 respectively. Further, when the dynamos are operated as generators, the signal controls the field chopper 24 so as to cause the field current to reduce and thus decrease the generator load as the accelerator potentiometer 10 indicates that the position of the accelerator pedal is increasing within its range of travel. During the second mode of field chopper 24 control, the current to the field is limited to protect the battery 48 if the battery terminal voltage becomes higher than a preset level. Finally, the circuits control the field chopper 24 such that when the brake pedal is depressed, the output signal fixes the field current at a level which provides substantially normal flux density within the field so that the regenerative braking may be controlled by varying the pulse width of the armature chopper 44 as previously described.

It has been generally recognized that dynamos when operated as motors are designed for a peak or maximum efficiency for a relatively narrow range of speed versus output torque. The design of motors in this fashion is well known such that the motor when operated at its rated power output, that is this predetermined relatively narrow range of speed versus a relatively narrow range of torque, the motor will provide most efficient operation. However, as the speed and torque of the motor varies over a wide range, the resulting motor efficiency is decreased. Since it is desirable to operate a hybrid vehicle such that the overall efficiency of the hybrid vehicle as a system is maximized, it is of course desirable to also operate the dynamos over wide speed and torque ranges. Previously, however, the dynamos were most efficient for the just described narrow ranges of speed versus torque, and thus the efficiency of any hybrid vehicle employing such dynamos is thus decreased.

It has been found, however, that, for a given speed and torque combination, the efficiency of the motor may be maximized by adjusting the magnetic flux concentration within the field which is of course proportional to the current flowing through the field coils. By varying the field current and thus the field magnetic flux as a function both of speed and torque, it is possible to maximize the operating efficiency of the motor over relatively large operating ranges of speed and torque and to thereby assist in achieving the desired goal of maximum hybrid vehicle efficiency.

To implement this desirable result, however, it is of course first necessary to determine the optimized field current for each combination of speed and torque. Various methods for accomplishing this will be apparent to those skilled in the art. However, the following method is suggested although alternative methods will likewise yield acceptable results.

In the following discussion, the term motor may be understood to mean that the dynamos 32 and 34 are operated as motors.

With reference to FIG. 5, a motor is operated throughout a range of torques designated, for example, torque 1, torque 2, and torque 3 and for each torque level the field is adjusted through a range of field currents which may be, for example, designated field 1, field 2, and field 3.

It is assumed that torque 1 is the least amount of torque and torque 3 is the greatest amount of the three torque settings torque 1, torque 2 and torque 3. Similarly, it is further assumed that field 1 is the least amount of current and field 3 is the greatest amount of current of the three field current settings field 1, field 2 and field 3.

For each of these combinations, the armature voltage is increased from zero to some desired maximum which may correspond to the full load voltage of the batteries 48 of FIGS. 1 and 2. As is well known to those skilled in the art, for these various combinations of torque and field and for increasing armature voltage, a corresponding armature speed will be developed.

For example, for torque 2 and field 2, a curve 600 represented in armature speed vs. armature voltage will result.

While operating the motor in this manner throughout these ranges, the armature current is also measured with respect to armature voltage. Using these two measurements, the efficiency of the motor may then be calculated in a manner which is well known to those skilled in the art, thereby producing a second curve 602.

Figure 6:
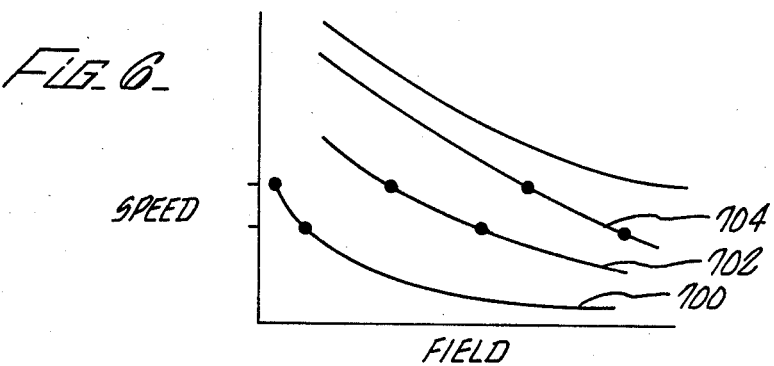
FIG. 6 is a graph showing speed versus field for constant lines of torque.

It is now to be seen that from the curves of FIG. 5, a set of composite curves such as those of FIG. 6 may now be created where, for a given torque and for various speeds with respect to that torque, the most efficient field current may be selected according to the efficiency curves 602. The result may, for example, be a curve such as curve 700 of FIG. 6 for torque 1 of FIG. 5. Thus it is seen that as the speed is varied for the given torque, for example, torque 1, the curve 700 will provide an optimum field current. Similarly, for torques 2 and 3, curves 702 and 704 may also be drawn. It is to be realized that the number of selected torque and field settings may be increased to thereby increase the resolution and accuracy of the curves of FIG. 6.

Again with reference to FIG. 6, it is thus seen that the curves 700, 702 and 704 thereof demonstrate the relationship between armature speed and field current for constant torques. More particularly, assuming that the accelerator potentiometer 10 of FIG. 2 remains at a given setting corresponding to constant torque, the optimum field current is predicted by FIG. 6 for varying speeds as will be detected by the tachometer 49 and, thus, the field chopper 24 drive signal from the field control output 226 (FIG. 3) is to vary accordingly.

Figure 7:
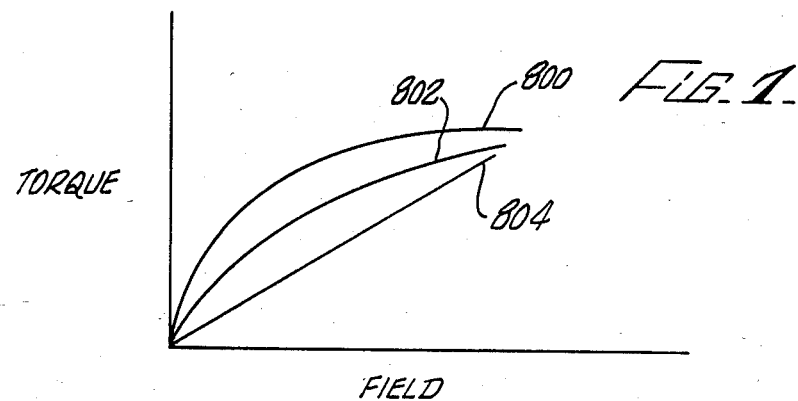
FIG. 7 is a graph showing torque versus field for constant speeds.

It is also to be observed that from curves similar to those of FIG. 5, a second composite set of curves may be generated as shown illustratively in FIG. 7. For example, a curve 800 relates changing torque to changing field for a constant low speed. Similarly, a curve 802 and a curve 804 relate torque and field for a constant moderate speed and a constant high speed, respectively. Thus these curves illustrate the relationship between torque and field for various constant speeds.

Again, and more particularly with reference to FIG. 2, FIG. 7 represents the relationship between the output of the accelerator pedal 10 when the output of the tachometer 49 is held constant at various selected speeds and, thus, represents the response of the field drive signal from the field curves 902 and 904 represent field vs. speed for decreasing torque. It is thus seen that the set of curves has a high limit 906, a low limit 908, a slope 910, a threshhold 912, a upper-knee portion 914, and a lower-knee or curved portion 916.

With reference now to FIGS. 4n and 4o, the field control output 226 includes an amplifer 480 which is responsive to the signal on the line 224 applied through a resistor 482 to the non-inverting input of the amplifier 480. A first potentiometer 484 which forms a portion of a voltage divider applies an adjustable signal to a second potentiometer 486. The adjustable tap of the potentiometer 486 is applied to the inverting input at the amplifier 480. The output of the amplifier 480 is applied through a resistor 488 to an amplifier 490 which in combination with two transistors 492 and 494 arranged in a complimentary emitter follower configuration comprises a field chopper control signal output amplifier 496. The potentiometer 484 adjusts the point on the curves of FIG. 8 where the threshhold 912a or 912b occurs. It is to be noted that the threshhold level varies in response to the torque required as selected by the accelerator potentiometer 10.

Figure 8:
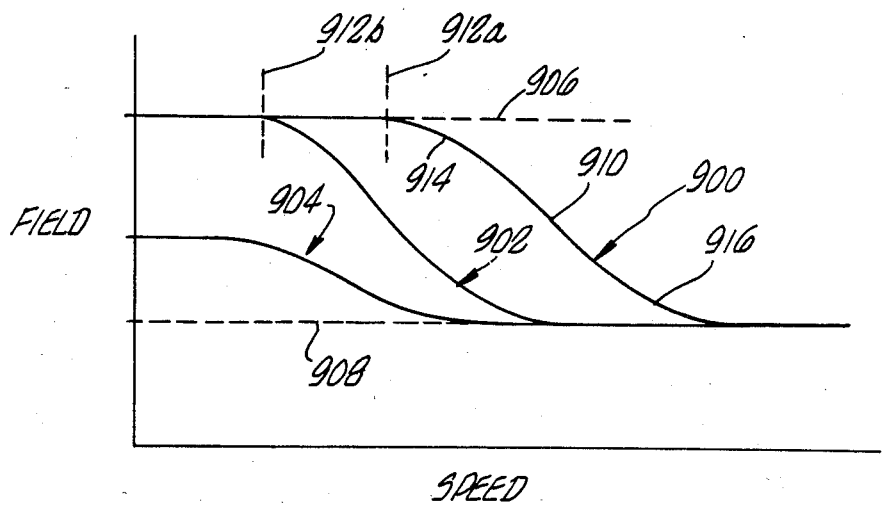
FIG. 8 is also a graph showing an exemplary field signal versus speed for various selected torques.

Further, the potentiometer 486 adjusts the slope 910 of the curves 900, 902 and 904 of FIG. 8.

The charger field control 258 applies a field modification signal along a line 286 to the field control output 226 and more particularly to the non-inverting input of the amplifier 490 (FIGS. 3 and 4n). With reference now to FIG. 4o, the circuitry shown there provides the suitable field modification signal on the line 286 of FIG. 3.

A potentiometer 496 is connected as part of a voltage divider and provides an adjustable signal through a diode 498 to the base of a transistor 500. A potentiometer 502 and a control output 226 (FIG. 3) which must be developed in response to selected constant tachometer output signals but for varying positions of the accelerator potentiometer 10.

It is to be noted, of course, that the curves of FIGS. 5, 6 and 7 represent selected operating parameters and that the operational characteristics between these parameters may be interpeliated or extrapolated through mathematical and graphical analysis techniques which are well known. Additionally, it will be understood by those skilled in the art that the number of selected data sets represented by each individual graph of FIG. 5 and the resulting curves of FIGS. 6 and 7 may vary widely according to, for example, the particular dynamo involved, the operating range, and the resulting accuracy desired.

Although the above described method may be used to determine the optimum field for various combinations of torque and speed, it will be still further recognized by those skilled in the art that various other techniques may be suitably employed to determine the relationship between field current and motor speed and torque so as to achieve maximum efficiency for each combination of speed and torque.

Returning again to a description of FIGS. 2, 3, 4n and 4o, the charger field control 258 and the field control output 226 cooperate to adjust the field current during the operation of the dynamos as motors to correspond to the field current required for the most efficient operation of the dynamo for a given torque and speed as determined by the accelerator potentiometer 10 and the tachometer 49, respectively.

The desired field control signal from the field control output 226 may be summarized as shown in FIG. 8 wherein a first curve 900 represents the desired field control signal with respect to speed for a relatively high torque and second diode 504 are connected in series between the emitter of the transistor 500 and the common point between the center arm of the potentiometer 496 and out of the diode 498. The potentiometer 502 is adjustable so as to provide the knee 916 in the curves of FIG. 8, that is, as the voltage at the emitter of the transistor 500 approaches the voltage established by the potentiometer 496, the diode 504 will begin to conduct through the potentiometer 502 and will thus form, the knee. However, once the transistor 500 is forward biased through the diode 498, the diode 498 and the transistor 500 thus clamp the signal applied to the input of the amplifier 490 (FIG. 4n) to the lower limit of the field 908 of FIG. 8.

A potentiometer 506 connected as part of a voltage divider provides an adjustable voltage to the base of a transistor 508. A collector of the transistor 508 is connected to ground and the emitter thereof is connected to the line 286. Once the signal at the input of the amplifier 490 reaches a level which will correspond to the high limit 906 of FIG. 8, the transistor 508 is forward biased to thereby establish that limit.

The terminal voltage of the battery 48 is applied along the line 288 to three voltage dropping zener diodes 510, 512 and 514 which in turn apply the voltage through a resistor 516 to the base of a transistor 518. The collector of the transistor 518 is then connected through a resistor 520 to a potentiometer 522 which is in turn connected through a resistor 524 to ground. The potentiometer 522 is connected to a first terminal of a N-channel enhancement mode FET 526. The FET 526 is controlled by a potentiometer 528 which accepts the first scaled accelerator signal from the line 201 and which is then connected to a bias adjustment potentiometer 530. The resistive element of potentiometer 530 is connected between ground and VEE. The output terminal of the FET is connected to the line 286.

The battery voltage thus controls the transistor 518 to provide a variable signal across the potentiometer 522 in proportion to the battery terminal voltage. The potentiometer 522 then provides a signal to the FET 526 which when summed by the amplifier 490 of FIG. 4n provides a field control signal to the field chopper 24 which provides a suitable field within the dynamos when they are operated as generators. Additionally, the transistor 518 acts to reduce the field available within the dynamos once the battery terminal voltage exceeds a desired limit.

The potentiometer 528 in combination with the nonlinear characteristics of the FET 526 act upon the signal at the input terminal of the amplifier 490 to provide within the armature control signal the non-linear characteristics of the torque curves 800, 802 and 804 of FIG. 7. In addition, the accelerator signal applied through the potentiometer 528 to the FET 526 increases the signal at the input of the amplifier 490 to thereby provide an increased field control signal when increased torque is required as reflected by the position of the accelerator potentiometer 10. The brake gate signal when applied to a FET switch 532 from the line 209 establishes a brake field control signal as adjusted by a potentiometer 534 which applies an adjustable signal to the FET switch 532. A load reduction potentiometer 536 adjusts the field current during braking and thus the current generated by the dynamos to thereby adjust the braking performance.

It will be further understood that the signal applied to the FET 526 from the potentiometer 522 is also controlled by means of the acclerator signal appearing on the line 201. Thus, as the accelerator position is increased and when the dynamos are operating as generators, the increasing accelerator signal will tend to decrease the signal from the potentiometer 522 which is applied through the FET 526 to the amplifier 590, thus decreasing the field current as more torque is required from the heat engine and thereby substantially maintaining the operating load on the heat engine near its most efficient point for various positions of the accelerator pedal.

In summary, then, the charger field controller 258 and the field control output 226 provide a field control signal to the field chopper 24 which adjusts the field current for maximum operating efficiency of the dynamo as a motor, which causes the field to decrease as the accelerator pedal is pushed or if the battery terminal voltage becomes higher than a preset level. Finally, the circuitry provides a fixed field current to the dynamos during regenerative braking so that the amount of braking may be controlled as previously described by varying the pulse width or duty cycle of the armature chopper 44.

Having thus described the circuitry of FIG. 4 with respect to FIGS. 2 and 3 and with continued attention to FIG. 2, the contact pairs 60b and 60c control the clutch linear actuator 20 to engage or disengage the heat engine clutch. When the relay coil 60a is not energized, the contact pairs 60b and 60c complete a circuit in series with a first limit switch 66 to operate the actuator 20 so as to engage the clutch and close and ignition switch 68 which applies ignition power to the heat engine ignition system. Once the clutch is engaged, the limit switch 66 opens and prevents further movement of the actuator 20. When the vehicle is to be operated with electricity, the signal processor 12 applies a drive signal to the relay coil 60a which moves the contacts 60c and 60b so as to complete a circuit through a second limit switch 70 and the actuator 20. The limit switch 70 was closed when the clutch was moved from the disengaged position. Once the clutch is moved to the disengage position by the actuator 20, limit switch 70 opens and prevents further travel of the clutch actuator 20.

The override switch 58 may apply a control voltage to the relay coil 60a so as to operate the linear actuator 20 in the manner just described so as to disengage the heat engine clutch. It is to be noted that the switch 68 is open when the clutch is moved to the disengage position by means of the linear actuator 20, thus removing ignition power from the heat engine ignition system.

A heat engine emergency button 72 is normally closed across a section of the mode switch 18. Once the switch 72 is opened, however, the mode switch 18 may then be used to control the relay coil 60a through the switch 58 to thereby operate the clutch linear actuator.

The relay contact pairs 54b, 54c, 62b, 62c, 64b and 64c operate generally to implement the field and armature contactor logic 22 of FIG. 1. A contactor coil 73a is connected across normally open contacts of the contact pairs 54b and 54c. The contactor coil 73a controls a contactor 73b. Another contactor coil 76a similarly connected across normally open contacts of the contactor pairs 64b and 64c and the coil 76a similarly controls a contactor 76b. The contactor 73b connects one terminal of the armature 42 to the main battery 48 through the breaker 53 and the fuse 74. The contactor 76b is adapted to connect the same terminal of the armature 42 to ground. A contactor coil 80a is connected between a normally open contact or the contact pair 62c and ground. The coil 80a control the contact pairs 80b and 80c. A contactor coil 78a is connected between a normally closed contact of the contact pair 62b and ground and controls contactor pairs 78b and 78c.

The center arms of the contactors 78b and 80b are both connected to the positive terminal of the battery 48. The contactors 78c and 80c are both connected to the field chopper 24 which in turn may be controlled to connect and disconnect at a relatively high frequency the contactor 78c and 80c to ground.

It will be further observed that the center arm of the contactor 80c is connected to the normally open contact of the contactor 78b and that the normally open contact of the contactor 80b is connected to the center arm of the contactor 78c. Thus, when the contactor coil 80a is energized, the contactors 80b and 80c are energized thereby connecting the field coil 36 to the positive terminal of the battery 48 and connecting the field coil 38 to the field chopper 24. When the field chopper 24 is energized, current flows from the battery 48 through the contactor 80b, field coil 36, field coil 38, contactor 80c and the field chopper 24 to ground according to the frequency and duty cycle of the field chopper 24. Conversely, when the contactor coil 80a is de-energized and the contact coil 78a is energized, current will flow from the battery 48 through the contactor 78b, the field coil 38, field coil 36, the contactor 78c and the field chopper 24 according to the pulse width and frequency of the chopper. Thus by controlling the contactor coil 78a and 80a, the direction of current flow through the field coils 36 and 38 may be reversed.

Recalling now from the discussion above with respect to the signal processor of FIG. 3 that the coil 62a is deenergized when the vehicle is to be operated in a forward direction and that the coil 54a is energized when the dynamos 32 and 34 are to be operated as motors, the contact pairs 54b and 54c are controlled by the relay coil 54a so as to close the normally open contacts and to thus energize the contactor coil 73a which in turn through the normally open position of the contact pair 62c and 62b energizes the contactor coil 78a. The coil 73a closes the contactor 73b, connecting the armature 42 to the +48 VDC main power. Also, the contactors 78b and 78c connect main power through the field windings 38 and 36 and then to the field chopper 24, thereby establishing the correct field current direction for forward movement and also connecting the armatures 40 and 42 to the vehicle main power. The signal processor 12 then controls the field and armature choppers 24 and 44 as described above to propel the vehicle in a forward direction using electric drive.

However, now assuming that the dynamos 32 and 34 while operating in a forward direction are to be converted to function as generators, the relay coil 54a is de-energized and the relay coil 64a is energized. The relay contact pair 54c and the contact pair 54b in the de-energized position removes power from the coil 73a and instead connects power through the normally closed contacts of the contact pair 54c to the normally open contact pair of 64b. With the relay coil 64a energized, the normally open contacts of the contact pairs 64b and 64c are closed, thus applying current through the coil 76a and in turn in series through the coil 80a. These connections reverse the direction of field current by closing the contactor pairs 80b and 80c while disconnecting the armature 42 from vehicle main power and instead connecting the armature 42 through the contactor 76b to ground. The field and armature choppers 24 and 44 then control the field current and the armatures as previously described to generate current which flows from ground through the now closed contactor 76b, the armatures 42 and 40, through an emergency circuit breaking device 82 and through the chopper 44, the device 53 and the fuse 74 to the main battery 48.

It will be recognized by those skilled in the art that the armature chopper 44 typically may include an output transistor 84 and a comutator or fly wheel diode 86. The transistor 84 is controlled as a switch to alternately connect and disconnect the armature 40 to ground. When the dynamos are operating as generators, the fly wheel diode 86 conducts the generated current to the main battery 48 when the transistor 84 is not conducting in a manner similar to that of a ringing choke inverter as was described above. As is well known in the art, the field chopper 24 includes similar circuitry.

A bridge rectifier 88 is connected across the series connected field coils 36 and 38 to remove relay voltage transients which may appear when the current in the field is interrupted by the contactors 78b, 78c, 80b and 80c.

The protection diode 46 is connected from the common connection point between the armature 40 and the armature chopper 44 and the anode of the diode 26 is connected to ground. If the dynamos 32 and 34 are operated as motors at relatively high speed, it will be recognized that the back emf within the armatures 40 and 42 may exceed the vehicle main power voltage and may thus provide a potentially harmful voltage between the collector of the chopper transistor 84 and ground. The diode 46 shorts this voltage to ground and thus protects the transistor 84 from potential damage.

In a preferred embodiment of the invention, the field and armature choppers 24 and 44 may operate on a voltage other than the vehicle main power voltage and thus a power supply 88 may be suitably employed to provide the required chopper operating voltage.

The vehicle electrical system may also include additional safety fuses 90 and 92 and also the fuse 55 to isolate the potentially harmful high currents associated with the dynamos 32 and 34 from the remaining vehicle control system circutry. A shunt 94 may also be included in series with the main battery 48 to provide a voltage proportional to the current flowing to or from the battery. This voltage may be useful, for example, in connecting to a battery charge determining device such as that disclosed in a co-pending application Ser. No. 111,216 filed concurrently herewith entitled IMPROVED COULOMETER in the name of Smith and assigned to the same assignee as the instant application.

While an exemplary embodiment of the invention has been described, it is to be understood that the invention is not limited to the details herein explained. It is expected that those skilled in the art will recognize numerous variations and equivalents which come within the spirit of the invention and which are intended to be included herein.

What is claimed is:

1. In a hybrid electric vehicle control system wherein the vehicle includes a heat engine adapted to deliver mechanical power to vehicle drive train means, a power leveling system for operating the heat engine at a constant power output substantially near its peak efficiency point comprising
a dynamo adapted to receive mechanical power from the heat engine and to generate electric power in response to a control signal,
electric power storage means for receiving electrical power from the dyanmo,
first means for determining the heat engine power requirement for said vehicle drive train means and for generating a first signal proportional thereto, and
second means responsive to the first means for generating the control signal and for adjusting the control signal to vary the electrical power generated by the dynamo inversely with respect to the heat and load requirement for the vehicle drive train means to substantially operate the heat engine at a constant output near its peak efficiency point.

2. The control system of claim 1 wherein the dynamo includes a field winding and the second means is additionally for generating the control signal to energize the field winding to adjust the electrical power output of the dynamo.

3. In a hybrid electric vehicle having a vehicle drive train and a heat engine adapted to deliver mechanical power to the vehicle drive train, a power leveling system for operating the heat engine at a constant power output substantially near peak efficiency while delivering variable torque to the vehicle drive train, comprising
a dynamo adapted to receive mechanical power from the heat engine and to generate both electrical and mechanical power alternatively in response to a control signal and further adapted to deliver mechanical power to the vehicle drive train,
electrical power storage means adapted for receiving electrical power from and delivering electrical power to said dynamo,
first means for determining power requirements for the vehicle drive train and generating a first signal proportional thereto, and
second means responsive to said first signal for generating said control signal to vary the electrical and mechanical power generated by said dynamo porportionally with the difference between the vehicle drive train power requirements and the power output of the heat engine substantially near its peak efficiency.

4. The control system of claim 3 wherein said dynamo includes a field winding and said second means is additionally for generating the control signal to energize the field winding to adjust the electrical power output of the dynamo.

5. The control system of claim 34 wherein said dynamo is adapted to receive mechanical power from the vehicle drive train and to generate electric power in response to a braking signal.

6. In a hybrid electric power plant having an output and a heat engine adapted to deliver mechanical power to the output, a power control system adapted to deliver variable torque to the output, comprising
a dynamo adapted to generate and deliver mechanical power to the output in response to a control signal,
first means for determining the power requirements of the output and for generating a first signal proportional thereto
second means responsive to said first signal and adapted to respond to the power output of the heat engine to generate said control signal whereby said dynamo develops an amount of torque equal to difference of the optimum power output of the heat engine and the power requirements of the output.

* * * * *